(12) United States Patent
Mihelich et al.

(10) Patent No.: US 9,237,132 B2
(45) Date of Patent: *Jan. 12, 2016

(54) LOAD BALANCING IN A NETWORK WITH SESSION INFORMATION

(71) Applicant: Fortinet, Inc., Sunnyvale, CA (US)

(72) Inventors: Joe Mihelich, Folsom, CA (US); Son Pham, San Jose, CA (US); Jun Li, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/326,024

(22) Filed: Jul. 8, 2014

(65) Prior Publication Data

US 2014/0325636 A1    Oct. 30, 2014

Related U.S. Application Data

(63) Continuation of application No. 13/356,399, filed on Jan. 23, 2012, now Pat. No. 8,776,207.

(60) Provisional application No. 61/443,410, filed on Feb. 16, 2011, provisional application No. 61/542,120, filed on Sep. 30, 2011.

(51) Int. Cl.
*H04L 29/06* (2006.01)
*G06F 21/00* (2013.01)
*H04L 29/08* (2006.01)

(52) U.S. Cl.
CPC .......... *H04L 63/029* (2013.01); *H04L 63/0218* (2013.01); *H04L 67/1002* (2013.01); *H04L 63/0227* (2013.01)

(58) Field of Classification Search
CPC ............ H04L 67/1002; H04L 63/0218; H04L 63/029; H04L 67/1004; H04L 67/1029; H04L 63/1458; H04L 29/06
See application file for complete search history.

(56) References Cited

U.S. PATENT DOCUMENTS

| 6,553,029 B1 * | 4/2003 | Alexander .................... 370/389 |
| 6,880,089 B1 * | 4/2005 | Bommareddy et al. ........ 726/11 |
| 7,401,355 B2 | 7/2008 | Supnik et al. |

(Continued)

OTHER PUBLICATIONS

Blue Coat, "Technology Primer: VLAN Tagging," pp. 1-2, 2007.*

(Continued)

*Primary Examiner* — Jung Kim
*Assistant Examiner* — James J Wilcox
(74) *Attorney, Agent, or Firm* — Hamilton, DeSanctis & Cha LLP

(57) ABSTRACT

Methods and systems for balancing load among firewall security devices (FSDs) are provided. According to one embodiment, a switch maintains session data the session entries of which represent established traffic sessions between a source and a destination and form an association between the traffic session and a particular FSD. A data packet of a traffic session from a client device directed to a target device is received at the switch. When none of the session entries are determined to correspond to the data packet, an FSD is selected to associate with the first traffic session by performing a load balancing function on at least a portion of the data packet. When a matching session entry exists, an FSD identified by the matching session entry is selected to process the data packet. The data packet is then caused to be processed by the selected firewall security device.

6 Claims, 23 Drawing Sheets

(56) References Cited

U.S. PATENT DOCUMENTS

| | | | |
|---|---|---|---|
| 7,440,467 B2* | 10/2008 | Gallatin et al. | 370/401 |
| 7,657,940 B2 | 2/2010 | Portolani et al. | |
| 7,672,236 B1* | 3/2010 | Karunakaran et al. | 370/230.1 |
| 7,792,047 B2 | 9/2010 | Gallatin et al. | |
| 7,796,613 B2 | 9/2010 | Wackerly | |
| 7,941,837 B1 | 5/2011 | Jiang et al. | |
| 8,015,298 B2* | 9/2011 | Yevmenkin | H04L 67/1002 709/202 |
| 8,176,553 B1 | 5/2012 | Magdych et al. | |
| 8,261,337 B1* | 9/2012 | Liu | H04L 63/02 709/238 |
| 8,776,207 B2 | 7/2014 | Mihelich et al. | |
| 2003/0051155 A1* | 3/2003 | Martin | H04L 63/029 726/11 |
| 2004/0153669 A1* | 8/2004 | Yang | H04L 63/145 726/22 |
| 2006/0053485 A1* | 3/2006 | Li | H04L 29/12009 726/11 |
| 2006/0215684 A1* | 9/2006 | Capone | H04L 63/029 370/437 |
| 2006/0230129 A1* | 10/2006 | Swami | H04W 12/12 709/223 |
| 2007/0180226 A1* | 8/2007 | Schory et al. | 713/153 |
| 2007/0180513 A1* | 8/2007 | Raz | H04L 29/12481 726/12 |
| 2008/0291826 A1 | 11/2008 | Licardie et al. | |
| 2008/0301798 A1* | 12/2008 | Hao | H04L 12/2602 726/13 |
| 2009/0276842 A1* | 11/2009 | Yevmenkin et al. | 726/13 |
| 2010/0036903 A1 | 2/2010 | Ahmad et al. | |
| 2011/0026527 A1 | 2/2011 | Shao et al. | |
| 2011/0196977 A1* | 8/2011 | Lynch | H04W 8/186 709/229 |
| 2013/0332613 A1* | 12/2013 | Yevmenkin | H04L 29/12405 709/226 |
| 2014/0143854 A1 | 5/2014 | Lopez et al. | |
| 2014/0173018 A1* | 6/2014 | Westphal | H04L 41/0823 709/213 |
| 2015/0095969 A1* | 4/2015 | Jain | H04L 63/20 726/1 |
| 2015/0117445 A1* | 4/2015 | Koponen | H04L 41/0896 370/389 |
| 2015/0319065 A1* | 11/2015 | Lida | H04L 65/60 709/219 |

OTHER PUBLICATIONS

Kopparapu, "Load Balancing Servers, Firewalls, and Caches," Wiley Computer Publishing, John Wiley & Sons, Inc, 2002, ISBN 0-471-41550-2, pp. 1-223.

Cisco Systems, Inc, "Catalyst 6500 Series Switch and Cisco 7600 Series Router Firewall Services Module Configuration Guide," 2004, pp. 1-382.

Non-Final Rejection for U.S. Appl. No. 13/356,399 mailed Apr. 18, 2014.

Notice of Allowance for U.S. Appl. No. 13/356,399 mailed May 27, 2014.

Final Rejection for U.S. Appl. No. 14/142,560 mailed Mar. 3, 2015.

Non-Final Rejection for U.S. Appl. No. 14/142,560 mailed Oct. 29, 2014.

Blue Coat et al., "Technology Primer: VLAN Tagging." pp. 1-2, 2007.

Non-Final Rejection for U.S. Appl. No. 14/804,093 mailed Sep. 8, 2015.

* cited by examiner

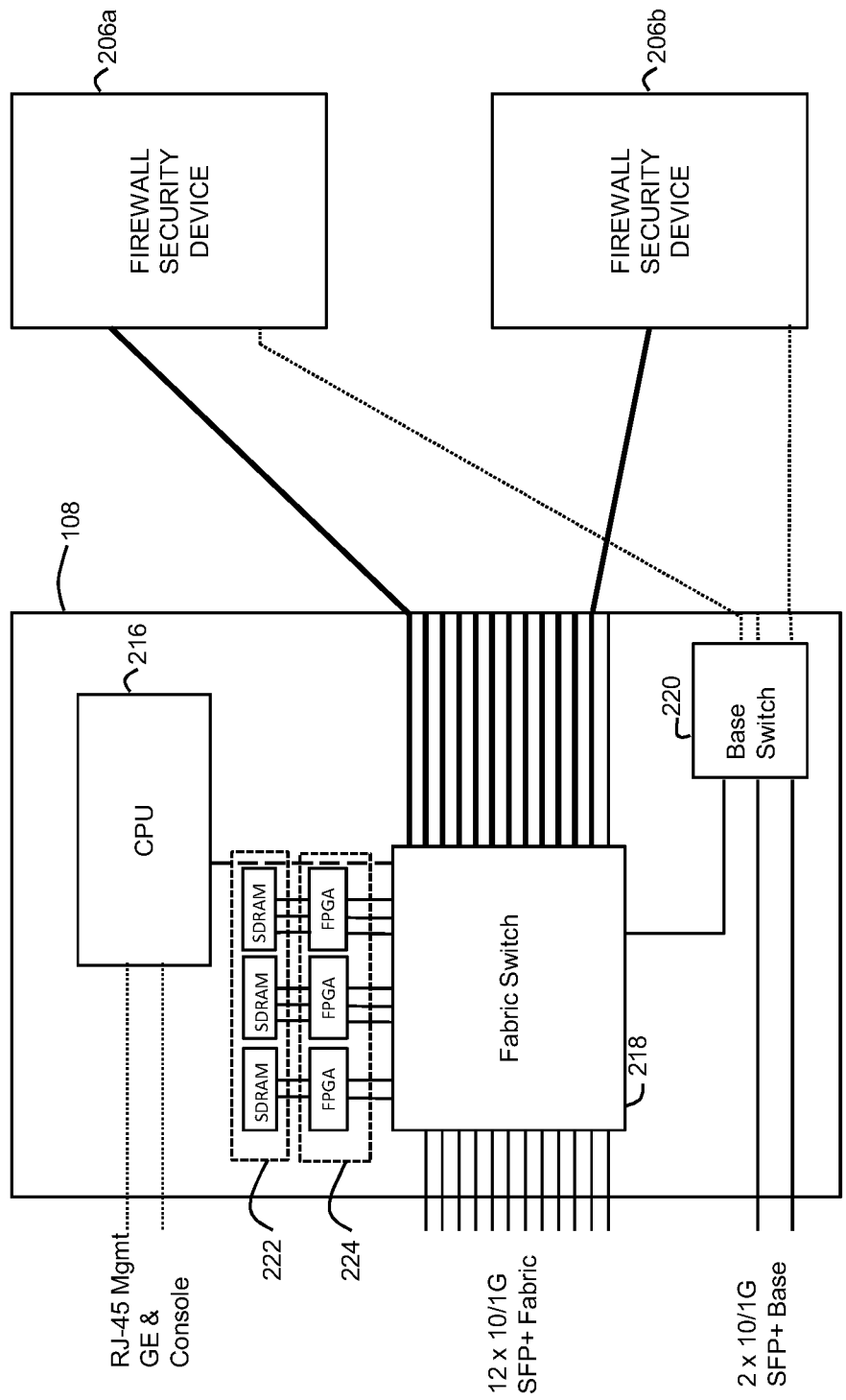

LOAD BALANCING IN A NETWORK WITH SESSION INFORMATION

CROSS-REFERENCE TO RELATED APPLICATIONS

This application is a continuation of U.S. patent application Ser. No. 13/356,399, filed on Jan. 23, 2012, now U.S. Pat. No. 8,776,207, which claims the benefit of U.S. Provisional Application No. 61/443,410, filed on Feb. 16, 2011 and U.S. Provisional Application No. 61/542,120, filed on Sep. 30, 2011, all of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2011-2014, Fortinet, Inc.

BACKGROUND

1. Field

Embodiments of the present invention generally relate to the field of load balancing in a computer network. In particular, various embodiments relate to a method and system for balancing load by a session aware switching device.

2. Description of the Related Art

Communication is the exchange of information between two people and/or entities. Many aspects of life that involve communication have been greatly affected by the Internet. The Internet includes many network nodes that are linked together such that information may be transferred among them. Examples of network nodes include routers that propagate a packet from one link to another.

Packets arriving at a network node are distributed to other nodes in a private network. A private network maybe formed from a set of servers that are each capable of working on the packets that arrive at the private network. Such networks may receive many packets in a short time frame. All the packets that enter or leave a private network have to pass through a firewall. Firewalls restrict unauthorized Internet users from accessing the private networks connected to the Internet. In order to reduce the rejection or loss of the arriving packets, the private network may rely on multiple servers/firewalls that can work on the arriving packets simultaneously. The arriving packets hence can be distributed among different firewalls to compensate for their rapid arrival. This distribution of packets among different firewalls is known as load balancing.

Devices that perform load balancing among the firewalls use hardware and software. The software usually operates to setup or tear down traffic flows, whereas the hardware accelerates the delivery of the traffic. One such device is a network switch that can balance load among multiple firewall systems. For example, a network switch may use a load balancing configuration for different firewalls; however, the network topology in such a configuration provides multiple return paths to the client and hence cannot ensure that the server responses will return through the same path. Additional limitations of existing load balancing systems include (i) lack of granularity, which results in imprecise control over the service quality; (ii) limited processing capabilities; and (iii) vulnerability to malicious attacks, such as a Denial of Service (DoS) attack.

SUMMARY

Methods and systems are described for balancing load among firewall security devices in a network. According to one embodiment, a session-aware switching device maintains session data. Each of the session entries of the session data represent a previously established traffic session from a particular source device to a particular destination device and form an association between the previously established traffic session and a particular firewall security device. A data packet of a first traffic session from a client device directed to a target device is received at a first port of the session-aware switching device. When none of the session entries are determined to correspond to the data packet, a firewall security device is selected form among multiple firewall security devices to associate with the first traffic session and a second traffic session from the target device to the client device by performing a load balancing function on at least a portion of the data packet. When a matching session entry of the session entries is determined to correspond to the data packet, a firewall security device identified by the matching session entry is selected to process the data packet. The data packet is then caused to be processed by the selected firewall security device.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 2B conceptually illustrates the interaction among various functional units of a switch in accordance with an exemplary embodiment of the present invention.

DETAILED DESCRIPTION

Figure 1:
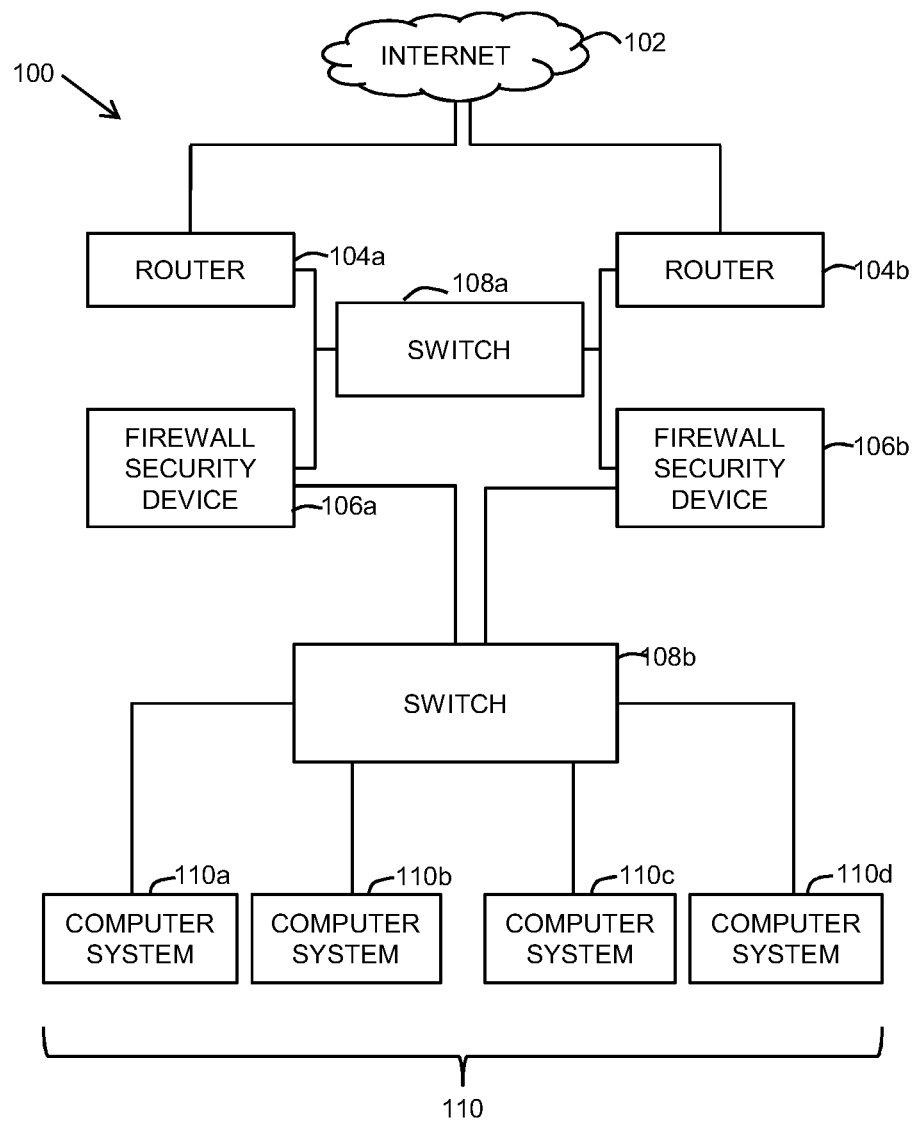
FIG. 1 is a block diagram illustrating a simplified network in which embodiments of the present invention may be employed.

Methods and systems are described for balancing load among firewall security devices in a network. Due to increasing network traffic, it is desirable to monitor individual applications to reduce network overhead over the switching device and ensure the performance and availability of different firewalls. Moreover, more granular load balancing provides for a more precise control over the service quality.

Due to limited processing capabilities of existing load balancing systems, it is necessary to provide a dynamic load balancing system. Furthermore, in case the switching device is flooded with packets for different sessions, the switching device becomes vulnerable to such attacks, which reduces the quality of service provided.

Hence, in light of the limitations described in the Background and the foregoing discussion, there is a need for a better load balancing solution in terms of scalability, dynamic load balancing, and management of load balancers. Additionally, it would be desirable if the load balancing solution could also protect the switching device from malicious attacks, such as the Denial of Service (DoS) attacks, while maintaining application performance.

According to an embodiment of the present invention, at a first port of a plurality of ports of a switching device in the network, a data packet is received from a client device. A session table is checked for a session entry from the client device to a target device. According to one embodiment, if a match in the session table is found the data packet is processed to an assigned firewall security device, which is identified by the matching session entry. According to another embodiment, if a match in the session table is not found, the data packet is processed to a firewall security device that is selected based on a load balancing function. After the processing, the data packet is forwarded to a second port of the plurality of ports of the switching device. A reverse session entry is then installed at the second port for a session from the target device to the client device.

In the following description, numerous specific details are set forth in order to provide a thorough understanding of embodiments of the present invention. It will be apparent, however, to one skilled in the art that embodiments of the present invention may be practiced without some of these specific details. In other instances, well-known structures and devices are shown in block diagram form.

Embodiments of the present invention include various steps, which will be described below. The steps may be performed by hardware components or may be embodied in machine-executable instructions, which may be used to cause a general purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present invention may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

While for sake of illustration embodiments of the present invention are described with reference to switching devices and firewall security devices available from the assignee of the present invention, it is to be understood that the methods and systems of the present invention are equally applicable to switching devices and firewall security devices that are manufactured by others, including, but not limited to, Barracuda Networks, Brocade Communications Systems, Inc., CheckPoint Software Technologies Ltd., Cisco Systems, Inc., Citrix Systems, Inc., Imperva Inc., Juniper Networks, Inc., Nokia, Palo Alto Networks, Sonic Wall, Inc. and Syntensia AB.

Similarly, for sake of illustration, various embodiments of the present invention are described with reference to, physical firewall security devices being members of load balancing clusters, it is to be understood that the methods and systems of the present invention are equally applicable to environments in which the firewall security devices are implemented as virtual systems in which case a physical device could have virtual systems belonging to multiple clusters.

Terminology

Brief definitions of terms used throughout this application are given below.

The term "client" generally refers to an application, program, process or device in a client/server relationship that requests information or services from another program, process or device (a server) on a network. Importantly, the terms "client" and "server" are relative since an application may be a client to one application but a server to another. The term "client" also encompasses software that makes the connection between a requesting application, program, process or device to a server possible, such as an FTP client.

The term "cluster" generally refers to a group of firewall security devices that act as a single virtual firewall security device to maintain connectivity even if one of the firewall security devices in the cluster fails.

The term "cluster unit" generally refers to a firewall security device operating in a firewall security device High Availability (HA) cluster.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in one embodiment," "according to one embodiment," "and the like" generally mean the particular feature, structure, or characteristic following the phrase is included in at least one embodiment of the present invention, and may be included in more than one embodiment of the present invention. Importantly, such phrases do not necessarily refer to the same embodiment.

The term "failover" generally refers to a firewall security device taking over processing network traffic in place of another unit in the cluster that suffered a device failure or a link failure.

The term "firewall security device" generally refers to a logical or physical device that provides firewall security functionality by implementing various firewall policies; however, a firewall security device is not limited to performing firewall security functionality and may perform other content processing functions, including, but not limited to scanning/processing of web (HTTP), file transfer (FTP), and email (SMTP, POP3, and IMAP), antivirus processing, intrusion prevention and hardware acceleration. In some embodiments, the firewall security devices are specialized processing blades installed within a chassis that also includes a load balancing hub blade, such as a sophisticated Ethernet switching device. In some embodiments, a physical device (e.g., a processing blade) may include multiple virtual systems that operate as firewall security devices.

The term "high availability" generally refers to an ability that a cluster has to maintain a connection when there is a device or link failure by having another unit in the cluster take over the connection, without any loss of connectivity. To achieve high availability, all firewall security devices in the cluster share session and configuration information.

If the specification states a component or feature "may", "can", "could", or "might" be included or have a characteristic, that particular component or feature is not required to be included or have the characteristic.

The term "server" generally refers to an application, program, process or device in a client/server relationship that responds to requests for information or services by another program, process or device (a server) on a network. The term "server" also encompasses software that makes the act of serving information or providing services possible.

The term "switching device" generally refers to a logical or physical device that provides multi-port bridging functionality. For example, a switching device may be an active element working on layer 2 of the Open Systems Interconnection (OSI) model. Switching devices may use filtering/switching techniques that redirect data flow to a particular firewall security device, based on certain elements or information found in network traffic data packets. In one embodiment, a switching device distributes network traffic data packets among its ports (and associated firewall security devices) depending upon the content, elements or information associated with the packet and/or packet header, including, but not limited to a source or destination address, a source or destination port and the like.

FIG. 1 is a block diagram illustrating a simplified network 100 in which embodiments of the present invention may be employed. Network 100 may represent a private or public network, such as a Local Area Network (LAN) or a Wireless LAN (WLAN) coupled to the Internet 102. In the present example, network 100 includes two routers 104a and 104b, two firewall security devices 106a and 106b, two switching devices 108a and 108b (which maybe referred to individually simply as a switch or collectively as switches) and multiple computer systems 110a-d.

As network 100 is architected in accordance with the present example, switching device 108a load balances traffic originating from the Internet 102 among firewall security devices 106a and 106b and switching device 108b load balances traffic originating from computer systems 110 among firewall security devices 106a and 106b.

Routers 104a, 104b are devices that forward data packets from one network to another. In one embodiment, routers 104a, 104b forward data packets between the Internet 102 and network 100. In the present example, routers 104a-b are connected to firewall security devices 106a-b via switch 108a, which is logically interposed between the firewall security devices 106a-b and routers 104a-b. Similarly, switch 108b is logically interposed between computer systems 110a-b and firewall security devices 106a-b.

According to various embodiments of the present invention, firewall security devices 106a and 106b are used to protect network 100 from unauthorized access while permitting legitimate communication to pass. Firewall security devices 106a-b add a level of protection between computer systems 110a-b and the Internet 102, and permit or deny network transmissions based upon a set of rules. Further, firewall security devices 106a-b help to prevent viruses and worms from entering computer systems 110a-d and hence protects the computer systems from threats. Firewall security devices 106a-b may further implement firewall policies to control what users of computer systems 110a-d have access to.

In an embodiment of the present invention, firewall security devices 106a-b may implement one or more of the following techniques (depending on where the communication is taking place) to control the data flow:

Packet Filters: Firewall security devices 106a and 106b may not allow data packets to pass unless the packets match a rule set. The rule set may be predefined by a user/administrator or default rules may be applied. This technique is used at a relatively low level of a Transmission Control Protocol (TCP)/Internet Protocol (IP) stack.

Application layer: Firewall security devices 106a and 106b may intercept all packets travelling to and from an application level of the TCP/IP stack, i.e., all the browser traffic or all the Telnet or the File Transfer Protocol (FTP) traffic, and block all other packets. In this technique, firewall security devices 106a and 106b apply rules on a per process basis instead of a per port basis.

Proxies: Firewall security devices 106a and 106b may respond to the input packets (such as connection requests), in the form of an application and block other packets.

Network Address Translation (NAT): Firewall security devices 106a and 106b may hide the true private internal addresses of one or more of computer systems 110a-d.

According to various embodiments of the present invention, firewall security devices 106a and 106b (i) provide gateway defense; (ii) carry out defined security policies; (iii) hide and protect internal network addresses; (iv) report on threats and activity; and (v) segregate activity between a trusted network, and the Internet.

Referring to FIG. 1, firewall devices 106a and 106b are connected to switches 108a-b. In an embodiment, switches 108a-b may comprise network or Ethernet switches. A network switch is a computer networking device that connects various segments of network 100. Further, in operation, switches 108a-b may process and route data at the data link layer, i.e., layer 2 of the Open Systems Interconnection (OSI) model. In an embodiment, switches 108a-b may process data at the network layer, i.e., layer 3 of the OSI model. Alternatively, switches 108a-b may represent multi-layer switches and operates at multiple layers of the OSI model.

Switch 108b is capable of channeling incoming data from computer systems 110a-d to a specific output port of switch 108b that will take the data packets to an intended destination. In an embodiment operable within an Ethernet LAN, switch 108b determines from the physical device address in each incoming data packet, which device the data packet is intended for and switches it out toward that device. In another embodiment, switches 108a-b are configured to perform load balancing. For example, switches 108a-b may employ a load balancing function (such as round-robin or layer 3 hashing) to distribute network traffic among firewall security devices (such as firewall security devices 106a-b). Switches 108a-b distribute the data among their ports (not shown) depending upon information, e.g., a source or a destination address, contained in the network traffic data packets. Switches 108a-b are also capable of determining the destination of the data packet and selectively forwarding the data packet to a firewall security device at which the data packet is required to be sent. Once, switches 108a-b know (learn) a destination port for a particular destination address, they sends data packets that are addressed to that destination address only to that port.

In an embodiment, switches 108a-b are session-aware switches and determine a firewall security device, to which data packet is required to be sent, on the basis of one or more session tables (not shown) maintained therein. The session table may be a database that stores information regarding message transactions between one computer system and another. The session table thus creates an open channel for further communications between these systems and saves the overhead of creating a new communication channel.

Though in FIG. 1, for the sake of illustration, four computer systems 110a-d are shown, network 100 can have more or fewer computer systems. In an embodiment, computer systems 110a-d are connected in a LAN. In another embodiment of the present invention, computer systems 110a-d are part of a WLAN. However, it should be apparent to a person ordinarily skilled in the art that computer systems 110a-d may also be connected in other network configurations without deviating from the scope of the present invention.

In an embodiment, computer systems 110a-d are configured to work as client devices. In another embodiment, computer systems 110a-d are configured to work as server computers. In still another embodiment, computer systems 110a-d may comprise a combination of client devices and server computers. According to various embodiments of the present invention, computer systems 110a-d may serve as a data center to house telecommunications and storage systems. The data center may include backup power supplies, data communications connections, environmental controls and security devices. Examples of computer systems 110a-d include desktop computers, laptops, notebook computers, handheld devices, such as mobile phones, smart phones, palm-top computers, Personal Digital Assistants (PDAs), navigational units and so forth. Various applications maybe run on computer systems 110a-d. Examples of the applications include, but are not limited to, web browsers, software applications, email applications and chat applications.

With continuing reference to FIG. 1, switches 108a-b connect computer systems 110a-d to the Internet 102 through firewall security devices 106a and 106b. In an example usage scenario, computer system 110a may initiate a phone connection to computer system 110b. Switch 108b receives the data packet of the invite and forwards the data packet to one of firewall security devices 106a-b. The selected firewall security device analyzes the data packet for any harmful content or threat. The selected firewall security device may then forward the content to one of routers 104a-b. The router, which is connected to the Internet 102, checks whether the invite is intended for network 100 or the Internet 102 by checking the destination address of the invite request, and accordingly forwards the data packet to the appropriate port (not shown) of switch 108b, which further forwards it to computer system 110b.

In an exemplary embodiment of the present invention, firewall security devices 106a-b may be a FORTIGATE security platform and switches 108a-b may be FORTISWITCH switching platforms available from Fortinet, Inc. of Sunnyvale, Calif. (FORTIGATE and FORTISWITCH are trademarks or registered trademarks of Fortinet, Inc.).

Figure 2A:
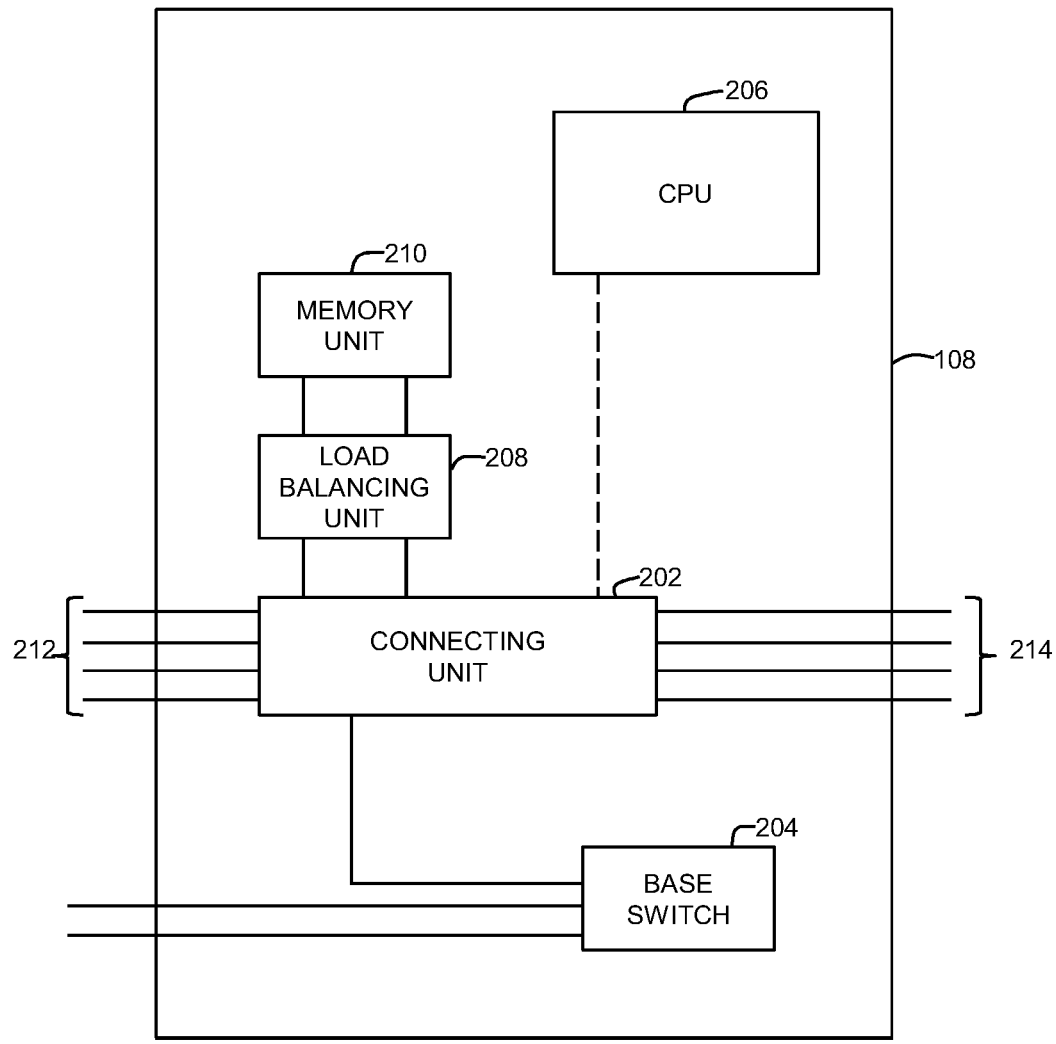
FIG. 2A is a block diagram conceptually illustrating a simplified architecture of a switch, according to an embodiment of the present invention.

FIG. 2A is a block diagram conceptually illustrating a simplified architecture of switch 108, according to an embodiment of the present invention. As described in FIG. 1, switch 108 is capable of channeling incoming data from one or computer systems to a specific output port that will take the data packets to an intended destination. In the exemplary simplified architecture of FIG. 2A, switch 108 comprises a connecting unit 202, a base switch 204, a Central Processing Unit (CPU) 206, a load balancing unit 208, a memory unit 210, multiple ports 212, and multiple slots 214.

In one embodiment, connecting unit 202 may be configured to connect network nodes with one another. In an embodiment, connecting unit 202 serves to connect computer systems 110a-d directly or indirectly via firewall security devices 106a-b. In another embodiment, connecting unit 202 connects firewall security device 106a with the firewall security device 106b. Further, connecting unit includes multiple ports 212 and multiple slots 214. In an embodiment, the multiple ports 212 represent front panel ports and provide an interface to connect switch 108 with computer systems 110a-d. In another embodiment, the multiple slots 214 are security blades/ports and provide an interface to connect switch 108 with firewall security devices 106a and 106b.

In an exemplary embodiment, connecting unit 202 is a fabric switch. A fabric switch is a switch that may connect network nodes through a fiber channel topology, for example. This technology currently allows the connection of up to 32 million devices. Further, the fabric switch allows features, such as, many-to-many communication, device name lookup, security, and redundancy. The fabric switch is also capable of implementing zoning, which disables unwanted traffic between certain network nodes that are connected to it. In one embodiment, the fabric switch is used for data traffic whereas base switch 204 is used for management traffic, e.g., to monitor the state of the connections between switch 108 and network nodes.

Connecting unit 202 is connected to load balancing unit 208. Load balancing unit 208 implements a load balancing methodology, such as round-robin, layer 3 hashing, layer 3 and layer 4 hashing, to distribute network traffic among firewall security devices. In an embodiment, connecting unit 202 is configured to perform session aware load balancing to distribute network traffic. In the context of session aware load balancing, connection unit 202 is capable of creating session entries based on the message/data packets exchanged through ports 212 and slots 214. In some embodiments, session installation may occur only for SYN and/or SYN ACK data packets.

According to various embodiments of the present invention, connecting unit 202 may be an integrated circuit designed to be configured by a customer after manufacturing, such as a Field Programmable Gate Array (FPGA). An FPGA contains programmable logic components called logic blocks and a hierarchy of reconfigurable interconnects that allow the blocks to be wired together. The logic blocks can be configured to perform simple logic gates like AND, OR, XOR or complex combinational functions. The logic blocks also include memory elements, which may be simple flip-flops or more complex blocks of memory.

Load balancing unit 208 is connected to memory unit 210. Memory unit 210 may have stored therein all or some portion of the session entry information. In an embodiment, memory unit 210 comprises a Double Data Rate (DDR) memory, which transfers data on both, rising and falling, edges of a clock signal.

In various embodiments, switch 108 is a session aware load balancing hub blade. It may be optimized for load balancing of traffic and flow inspection which utilizes packet by packet processing. In such processing, switch 108 does not hold the content during inspection (like proxy type processing) before forwarding traffic between a client device and a server. This type of processing is used for firewalls, Intrusion Prevention Systems (IPS), flow Anti-Virus (AV), application control and other similar systems, without deviating from the scope of the invention.

It should be noted that, though in FIG. 2A, for the sake of illustration, only one load balancing unit and one memory unit have been shown, but a combination of any number of such units could be used, without deviating from the scope of the invention.

FIG. 2B conceptually illustrates the interaction among various functional units of switch 108, in accordance with an exemplary embodiment of the present invention. According to the present example, switch 108 includes a base switch 220, a fabric switch 218, a CPU 216, synchronous dynamic random access memory (SDRAM) 222 and FPGAs 224.

In one embodiment, switch 108 is Advanced Telecommunications Computing Architecture (ATCA) compatible. The ATCA backplane (not shown) provides point-to-point connections and does not use a data bus. ATCA backplane may be divided into three sections: Zone-1, Zone-2, and Zone-3. The connectors in Zone-1 provide redundant −48 VDC power and Shelf Management signals to the boards. The connectors in Zone-2 provide the connections to the Base Interface and Fabric Interface. Zone-2 is called Fabric Agnostic which means that any Fabric that can use 100Ω differential signals can be used with the ATCA backplane.

The connectors in Zone-3 are user defined and are usually used to connect a front board to a Rear Transition Module®. The Zone-3 area can also hold a special backplane to interconnect boards with signals that are not defined in the ATCA specification.

In one embodiment, base switch 220 is the primary fabric on the Zone-2 connectors and allocates 4 differential pairs per base channel. It is commonly used for out of band management, firmware uploading, Operating System (OS) boot, among other things.

In an embodiment of the present invention, base switch 220 is a Broadcom BCM56321 with 24×GE and 4×10 GE ports, supports 2×10 G SFP+ front panel base ports, and supports 1 G for base connections to firewall security devices (e.g., firewall security devices 206a-b), such as FORTIGATE security blades and the hub blade. Further, base switch 220 may also support a 1 G connection to CPU 216, through an Intel 82576 GE MAC, for example.

The fabric switch 218 on the backplane supports many different fabrics and can be wired as a Dual-Star, Dual-Dual-Star, Mesh, Replicated-Mesh or other architectures. The fabric switch allocates 8 differential pairs per Fabric Channel and each Channel can be divided into four 2-pair ports. The fabric interface is typically used to move data between the boards and the outside network.

In an embodiment, fabric switch 218 is a Broadcom Trident BCM56845 with 64×10 Gig Ethernet (GE) and/or 16×40 Gigabits (G) ports. Fabric switch 218 also supports 12×10 G enhanced small form-factor pluggable (SFP+) to the front panel ports. The SFP is a hot-pluggable transceiver used for both telecommunication and data communications applications and interfaces the mother board of a network device (such as a switch, router, media converter or similar device) to a fiber optic or copper networking cable. Further, fabric switch 218 may support 10 G-Ten Attachment Unit Interface (XAUI), 10 G-KR, 40 G-KR4 and 1 G signaling for communication with firewall security devices (e.g., firewall security devices 206a-b), such as FORTIGATE security blades. Still further, switch 108 may also support 10 G connections to base switch 220 and 6 to 8 10 G connections to FPGA 224 (e.g., load balancing unit).

In an embodiment, CPU 216 comprises a single core, 1.73 GHz, 23 W Intel Jasper Forest processor and uses Ibex Peak for clocking. Further, switch 108 supports two channels of DDR3 SDRAM with 4 GB of memory.

According to the present example, the session aware load balancing capability of switch 108 is contained within one or more field programmable gate array (FPGA) devices 224 connected internally to fabric switch 218. Depending upon the particular implementation, FPGAs may be Altera Arria II GX EP2AGX190 FPGA devices, Altera Arria II GX EP2AGX125 FPGA devices or the like. Each FPGA may provide 2×10 GE packet processing channels (not shown), which are described further below. Each channel can operate independently and can accommodate up to 32 million concurrent IPv4 sessions while maintaining 10 Gbps throughput with a maximum session set-up rate of 6 million sessions per second. By aggregating these independent channels together, switch 108 is capable of learning 192 million concurrent sessions and learning at a combined rate of 36 million sessions per second.

In one embodiment, SDRAM 222 represents 512 MB of DDR3 SDRAM per FPGA 10 G port. Two different modes may be supported. One in which 2 GB of total memory is provided per blade and providing up to 16M session entries per FPGA 10 G port and another in which 4 GB of total memory is provided per blade and providing up to 32M session entries per FPGA 10 G port. In one embodiment, 128M session entries can be supported per blade.

In the present example, switch 108 is configured with 14 10 G/1 G SFP+ front panel ports, wherein 12 ports are fabric connections and two are base connections. In addition, one copper 10/100/1000 management (MGMT) port—Registered Jack 45 (RJ45), one Recommended Standard-232 (RS-232) serial console—RJ45 and one Universal Serial Bus (USB) socket may be supported.

Figure 3:
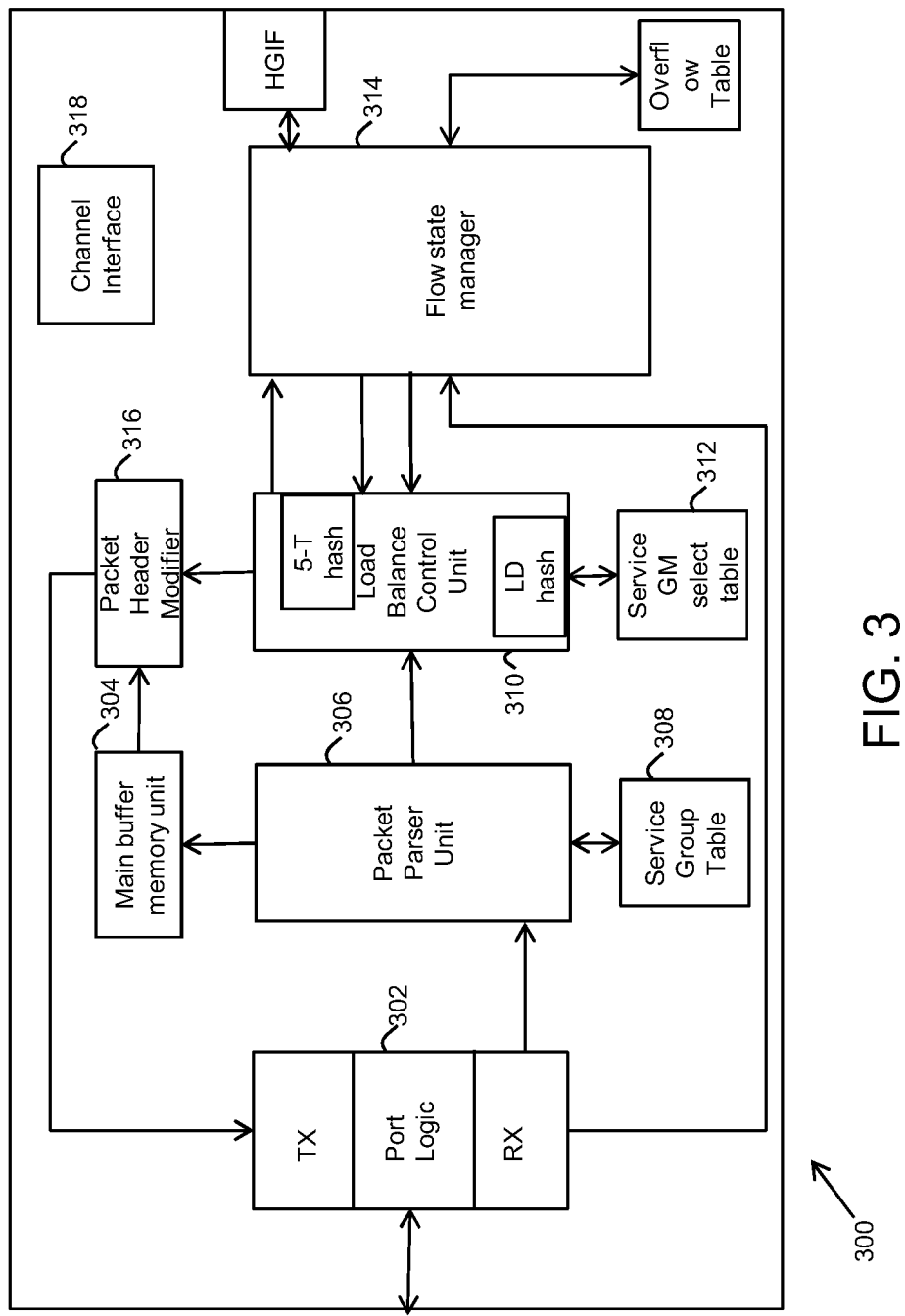
FIG. 3 is a block diagram conceptually illustrating the interaction among various functional units of a Process Channel, according to an embodiment of the present invention.

FIG. 3 is a block diagram conceptually illustrating the interaction among various functional units of a packet processing channel (PPC) 300, according to an embodiment of the present invention. According to one embodiment, PPC 300 is the primary building block of an FPGA. In the present example, PPC 300 comprises port logic 302, a main buffer memory unit 304, a packet parser unit 306, a service group table 308, a load balance control unit 310, a service group member select table 312, a flow state manager 314, a packet header modifier 316, and a channel interface 318.

In an embodiment, data packets that arrive at the FPGA port are initially filtered by the line card switch ASIC. For example, only TCP or UDP IP packets may be expected by the FPGA port for load balancing processing by the FPGA. In such a case, any type of data packets, other than TCP or UDP frames are forwarded to a firewall security device (e.g., firewall security device 206a-b) with a designated VLAN tag.

In the present example, PPC 300 is responsible for one user port. PPC 300 can be configured for use with either an ingress port or an egress port. In an embodiment, a pair of PPCs is used for a corresponding pair of ingress/egress ports. Packets passing through PPC 300 are marked as either from the ingress or egress path, and either as normal or pinhole type. The incoming packets may also be classified as either fragment IP packets or normal IP packets.

In one embodiment, Ethernet port logic 302 provides LOGE packet data processing. Main buffer memory unit 304 is a transit buffer, which may provide 64K bytes for packet buffering. A pause packet may be triggered when data buffer watermark exceeds a configurable threshold. Different configurable pause de-assertion thresholds may also be provided for enhanced control of the pause mechanism to achieve better flow control.

Packet parser unit 306 parses and classifies data packets for load balancing and/or forwarding criteria. Packet parser unit 306 also provides lookup data path into service group table 308. The selected group ID, user port VLAN tag, SIP and other related packet information are then passed to load balance control unit 310 for additional processing. With the pre-processed information received from packet parser unit 306, load balance control unit 310 performs load balancing functions/algorithms to acquire a service group member ID through looking up into service group member select table 312. In an embodiment, service group member select table 312 may also be configured for chaining groups. The final decision to drop/forward/load balance the packet at issue is encoded and passed on to packet header modifier 316. Based on the received commands, packet head modifier 316 drops or modifies the packet. The packet is then forwarded to port logic 302 for framing and transmission.

Flow state manager 314 provides per flow processing functions, by which a flow state is looked up, added, updated, and aged so that the same VLAN tag is used for forwarding the flow packets to their destination. Flow states are kept in a flow state table (not shown). In one embodiment, the flow state table comprises a primary table (implemented using external DDR3-SDRAM, for example), and an overflow table (implemented using internal FPGA block RAMs, for example). In an embodiment, the primary table provides up to 16 million flow entries, which are organized in 4 million buckets of 4 entries each. The overflow table may provide 3072 entries, organized in 256 buckets of 12 entries each. The flow state, which includes 5-tuples, and the VLAN tags, is added in one entry of either the primary or the overflow bucket.

In an embodiment, flow state manager 314 adds a flow associated with the packet at issue to the primary bucket. If the primary bucket is full, the flow state manager 314 adds the flow to the overflow bucket. In another embodiment, if both primary and overflow buckets are full, flow state manager 314 does not add the flow in the table at the present time and tries to add the flow when a subsequent packet of the same flow is seen.

Figure 4A:
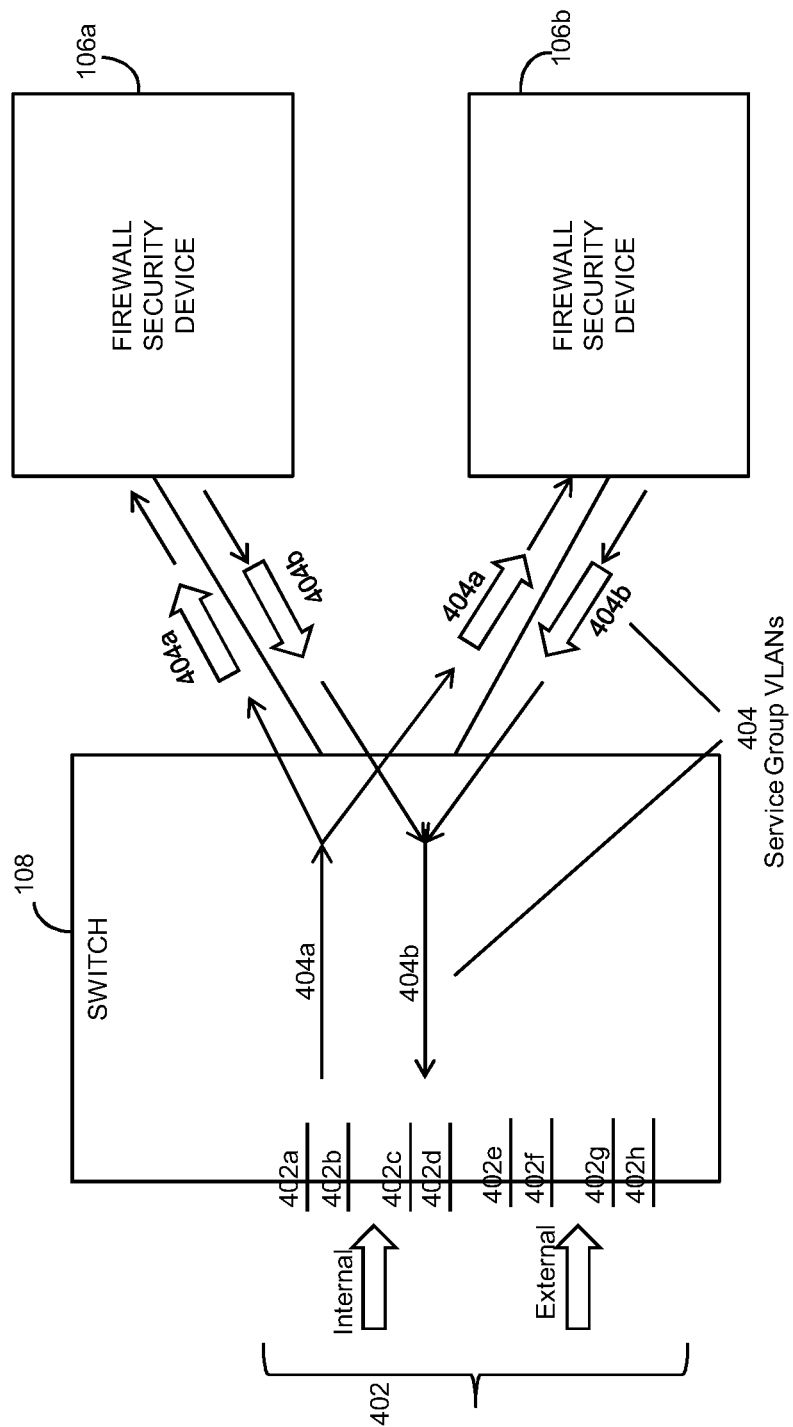
FIG. 4A is a block diagram conceptually illustrating a load balancing model used by a switch in accordance with an embodiment of the present invention.

FIG. 4A is a block diagram conceptually illustrating a load balancing model used by switch 108 in accordance with an embodiment of the present invention. In the present simplified example, switch 108 is configured to balance load among two firewall security devices 106a and 106b. It should be noted that though in FIG. 4A, the load balancing model is explained for two firewall security devices and one switch, the same load balancing model could be extended to any number of switches and firewall security devices.

As explained with reference to FIGS. 2A and 2B, switch 108 may be comprised of hardware and software components. In the present example, switch 108 has eight front panel ports 402a-h. The software of switch 108 supports load balancing of traffic from front panel ports 402 to/from the firewall security devices 106a and/or 106b via fabric slots (not shown).

In an embodiment, in a load balancing model employed by switch 108, front panel ports 402 are divided into a set of internal ports (e.g., ports 402a-d) and a set of external ports (e.g., ports 402e-h). These two sets of ports may correspond to private and public customer networks. For example, in an embodiment, the set of internal ports may correspond to a private or an internal customer network and the set of external ports may correspond to a public or an external customer network. In another embodiment, the set of internal ports may correspond to a public or an external customer network and the set of external ports may correspond to a private or an internal customer network.

In the present example, the data traffic that enters front panel ports 402 is tagged with a service group Virtual Local Area network (VLAN) tag 404 corresponding to a service group with which the front panel port at issue is associated. A VLAN generally represents a group of hosts with a common set of requirements that communicate as if they are attached to the same broadcast domain, regardless of their physical location. Hence, a VLAN has essentially the same features as that of physical LAN, but it allows for the computer systems to be grouped together even if the computer systems are not located on the same switch. In an embodiment, the data traffic that enters front panel port 402a is tagged as being associated with a VLAN 404a, the data traffic that enters front panel port 402b is tagged as being associated with a VLAN 404b, and so on. After the data traffic entering the internal/external port is tagged with a service group VLAN tag 404, it is load balanced to the firewall security device (e.g., firewall security device 106a-b) belonging in that service group. The service group VLAN tags 404 may be used by the firewall security devices to identify internal versus external network traffic. For example, traffic entering a firewall security device on an internal VLAN exits that firewall security device on the external VLAN and vice versa.

Figure 4B:
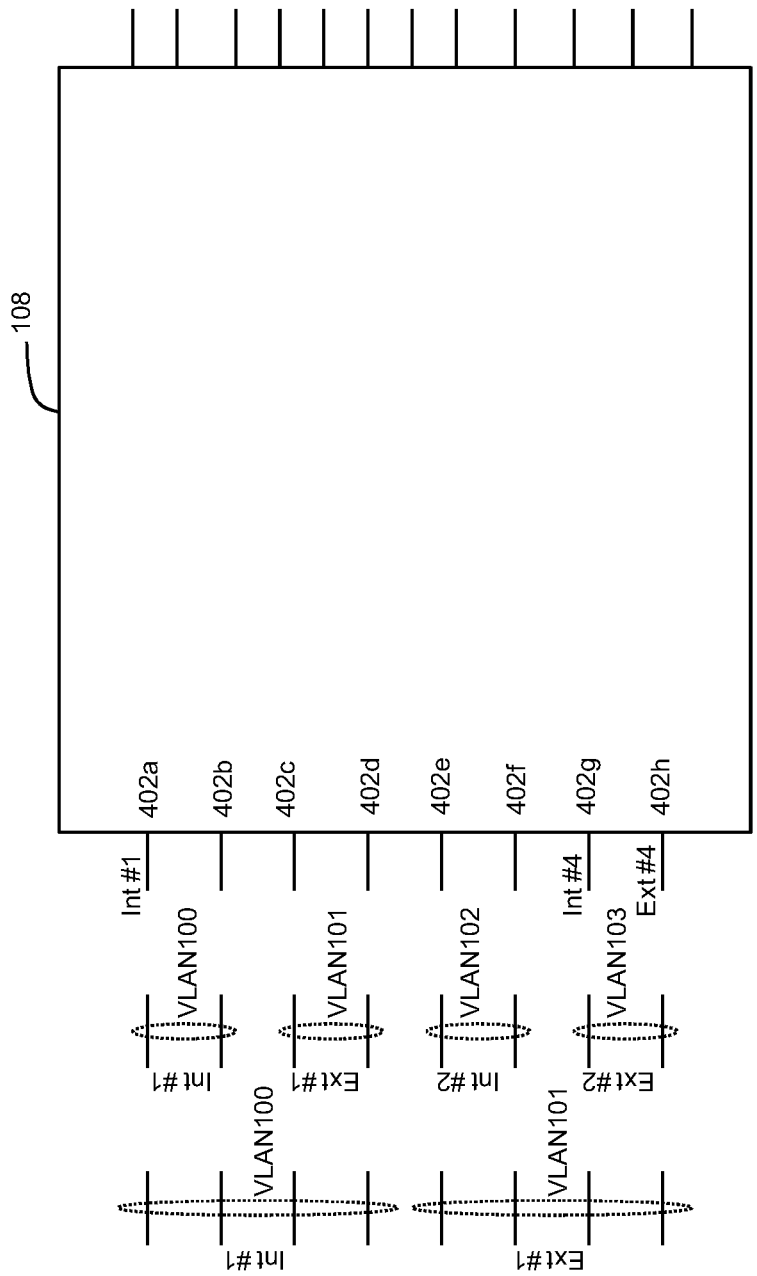
FIG. 4B shows three possible configurations of front panel ports of a switch, according to various embodiments of the present invention.

While in the context of FIG. 4A, for sake of illustration, a single port pairs configuration is used to categorize front panel ports 402 into internal and external ports, it is to be noted that 2-port pairs and 4-port pairs configurations are also possible as illustrated by FIG. 4B. As shown in FIG. 4B, when a 2-port pair configuration is used (for eight front panel ports 402a-h) there would be four VLANs, i.e., VLAN 100-103, and when 4-port pairs configuration is used (for eight front panel ports 402a-h) there would be two VLANs, i.e., VLAN 100 and VLAN 101.

Notably, in one embodiment 8 independent ports can be supported running in a single service group in a non-load balancing mode. In such a mode, there is no reference to internal/external ports. Rather the user simply has 8 ports to work with and route traffic and can route traffic any way they want. In one embodiment, a dual-controller configuration can support 16 independent ports (8 on each controller).

Figure 4C:
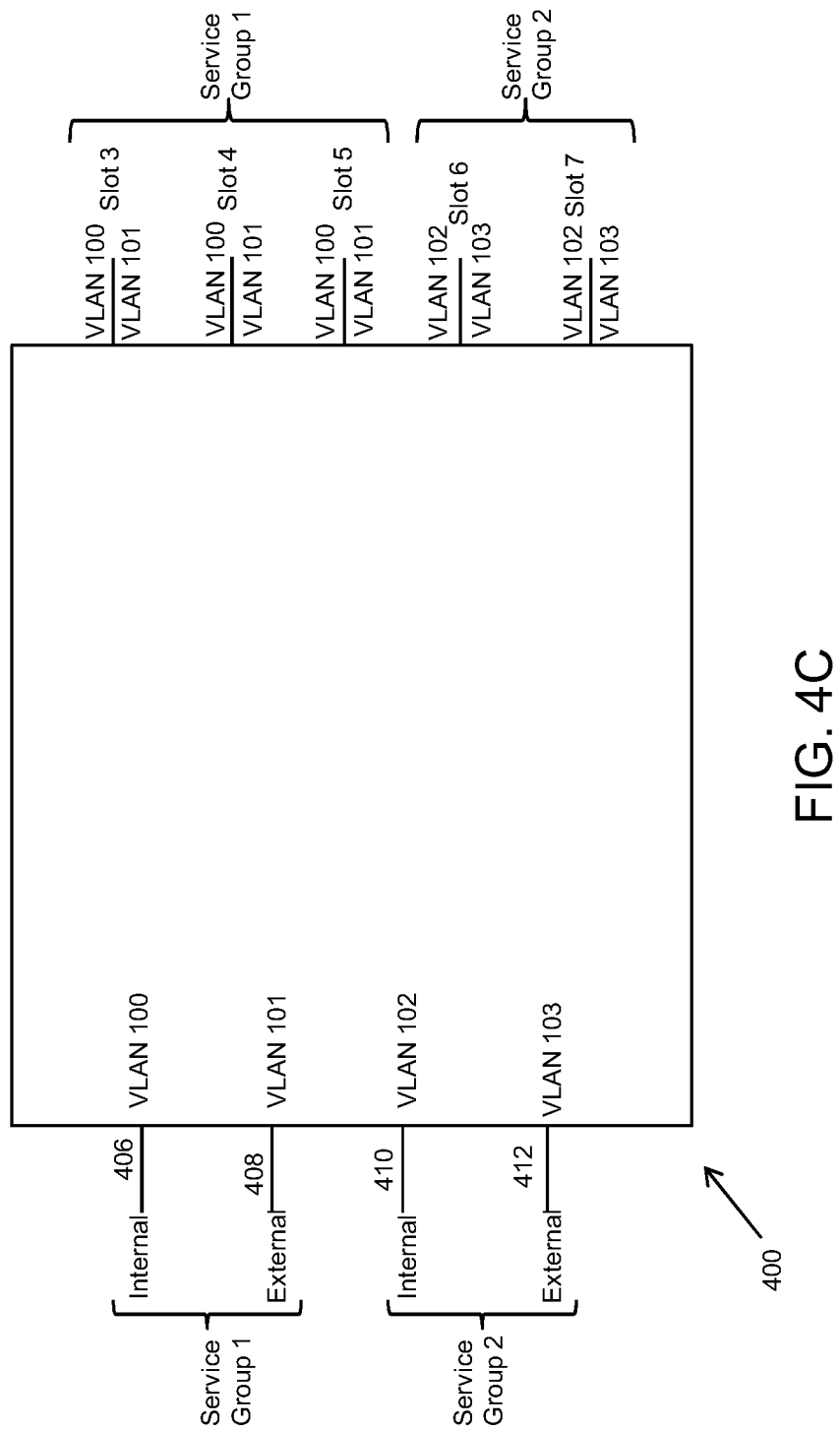
FIG. 4C conceptually illustrates the Virtual Local Area Network (VLAN) tags and Service Groups associated with a data traffic at a switch, according to an embodiment of the present invention.

FIG. 4C conceptually illustrates the Virtual Local Area Network (VLAN) tags and Service Groups associated with data traffic at a switch 400, according to an embodiment of the present invention. In the present example, switch 400 includes multiple front panel ports 406, 408, 410 and 412 and multiple fabric slots (i.e., slot 3-7). As explained above, VLANs are associated with each of the front panel ports. In an embodiment, port 406 corresponds to a VLAN 100, port 408 corresponds to a VLAN 101, port 410 corresponds to a VLAN 102, and port 412 corresponds to a VLAN 103. Further, in the present example, VLAN 100 and VLAN 102 correspond to the internal network, and VLAN 101 and VLAN 103 correspond to the external network.

A firewall security device interfaces with each of fabric slots 3-7. In an embodiment, each of the internal and external networks may be categorized into one or more service groups. The service groups are used by a firewall security device to identify internal network versus external network. Referring to FIG. 4C, port 406, port 408, slot 3, slot 4 and slot 5 belong to Service Group 1, whereas port 410, port 412, slot 6 and slot 7 belong to Service Group 2.

While for purposes of simplicity, switch 400 has been described with reference to a limited number of front panel ports and fabric slots, it should be noted switches employing embodiments of the present invention may include any number of front panel ports and fabric slots. Further, any number of service groups may be used to categorize the front panel ports and the fabric slots.

Data packets received on any of the front panel ports 406, 408, 410 and 412 are marked with a VLAN tag (e.g., VLAN 100-103). These VLAN tags are used by the load balancing unit (not shown) of switch 400 to identify which port the packet was received on and the associated service group designation. The load balancing unit then associates a new VLAN tag with the data packet that combines both the slot number (the firewall security device to be used for processing of the data packet) and the service group. This is indicated by the slot-#|Service Group notation. Switch 400 then redirects the data packet to the slot number indicated by the VLAN tag and rewrites the VLAN tag with the VLAN tag for the service group.

For purposes of illustration, assume a TCP packet is received at port 406. Switch 400 associates VLAN 100 and service group 1 with the received TCP packet. When the TCP packet is forwarded to the load balancing unit for processing, the load balancing unit performs a look up in its session table for a session entry match. In an embodiment a match is found and the TCP packet is to be processed by a firewall security device interfaced with slot 3. The load balancing unit then associates a new VLAN with the TCP packet that corresponds to the slot number of the firewall security device and the service group number. According to this example, the new VLAN tag corresponding to the TCP packet would be Slot3|Service Group 1. Switch 400 then forwards the TCP packet to slot 3 for processing by the firewall security device interfaced thereto.

In one embodiment, when a data packet is received from the firewall security device via one of fabric slots 3-7, the data packet is marked with a service group VLAN tag (e.g., VLAN 100-103). Switch 400 then redirects those packets to the correct outgoing interface and may remove the service group VLAN tag. In another embodiment, for data packets like TCP SYN, TCP RST and TCP FIN packets, switch 400 may also redirect these packets to the respective ingress port of the return packet. A symmetric Link Aggregation Group (LAG) hash on those FPGA ports will distribute such packets to the correct FPGA port in the LAG (LAGs assist in treating multiple switch ports as a single switch port and provide redundancy in case one of the links fails).

In various of the above described embodiments, it is assumed that all of the firewall security devices are the same models and are identically configured; however, it should be noted that firewall security devices of different configurations may also be used.

Figure 5:
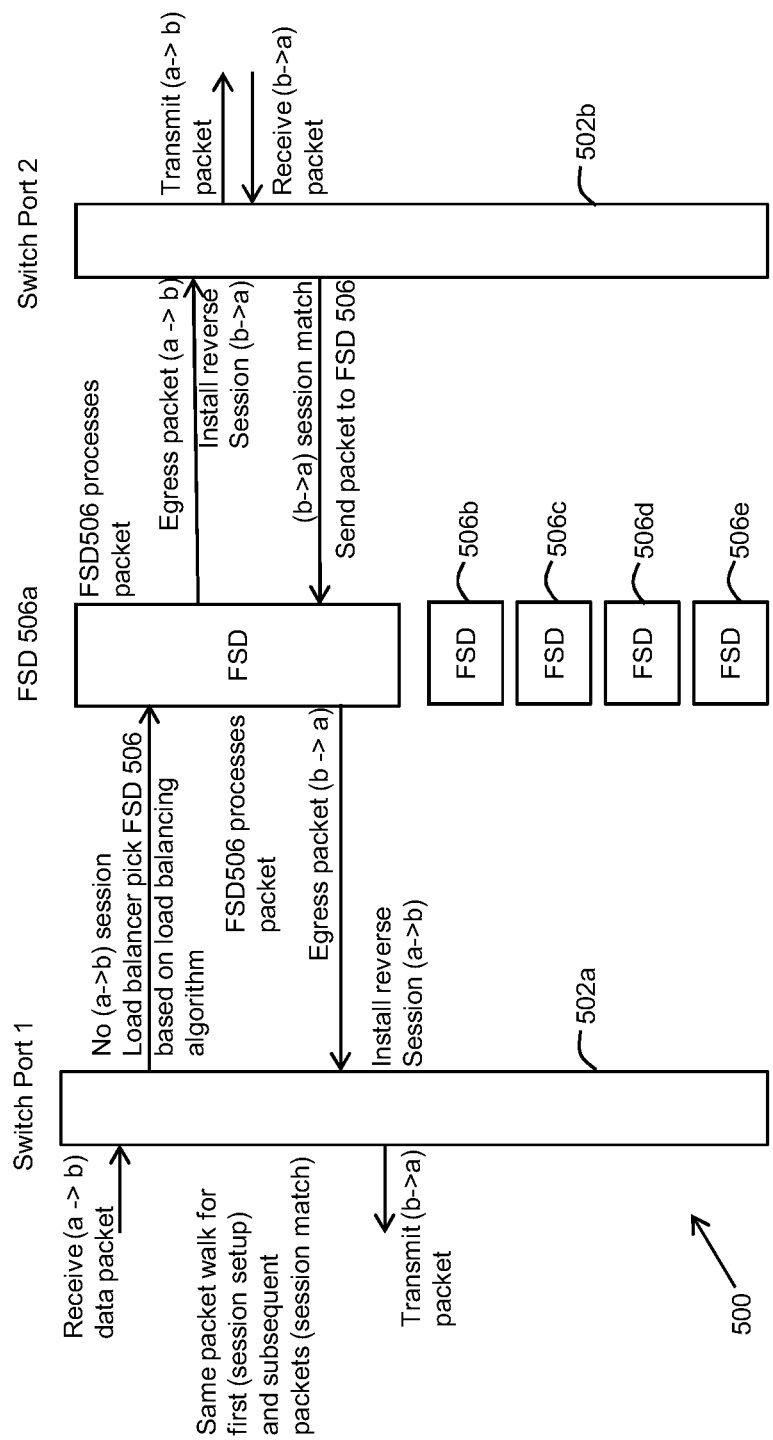
FIG. 5 conceptually illustrates a system level data packet processing walkthrough for a load balancing switch, according to an embodiment of the present invention.

FIG. 5 conceptually illustrates a system level data packet processing walkthrough, according to an embodiment of the present invention. In the present example, switch 500 comprises a switch port 502a, a switch port 502b, and multiple firewall security devices (FSDs) 506a-e. Switch ports 502a and 502b are two different ports that belong to the same switch (i.e., switch 500). Two different network devices/computer systems may be connected to switch ports 502a and 502b. Firewall security devices 506a-e are configured to support security processing functions.

In an embodiment, switch 500 performs session aware load balancing. When a data packet arrives at switch port 502a, from a source network device (e.g., Client A) switch 500 checks its session table for matching session entry to which the received data packet corresponds, as described further below. The session table may be represented in the form of a database that stores augmented information regarding message transactions between two or more network devices.

For purposes of the present example, in FIG. 5, assume that a first data packet (e.g., a TCP SYN packet) for a particular session and having source address A and destination address B is received by switch 500. When the data packet arrives at ingress port 502a, switch 502 checks its session table for a matching session entry. As described further below, session entries may contain information such as a source port number, a destination port number, a protocol field, a source IP address, a destination IP address, and a VLAN Identification (ID).

In the present example, since this is the first data packet for the current session, no matching session entry is found. Consequently, switch 500 uses a load balancing function/algorithm to pick one of firewall security devices 506a-e. The load balancing algorithm is a methodology to distribute workload across multiple network nodes (in this case, firewall security devices) in a system. The various techniques used by switch 500 to balance load may include round-robin, layer 3 and layer 4 hashing among others, without deviating from the scope of the invention.

Continuing with the present example, after switch 500 selects one of firewall security devices 506a-e, switch 500 then processes and sends the data packet to the selected firewall security device (in this example, FSD 506a). During egress packet processing, at the egress port (i.e., switch port 502b), prior to transmitting the data packet to the destination network device (e.g., Server B), switch 500 installs a reverse session entry (i.e., a session entry for the reverse path b→a) for Server B associated with switch port 502b to Client A associated with switch port 502a. The reverse session entry also identifies which firewall security device (in this example, FSD 506a) was selected to process the current session.

In one embodiment, session installation occurs if and only if a firewall security device (e.g., FSD 506a) forwards the data packet to switch port 502b. In this manner, switch 500 is less vulnerable to a Denial of Service (DOS) attack in which an attacker attempts to flood switch 500 with packets (e.g., TCP SYN packets) for different sessions, since the DOS attack is moderated by the firewall security device that forwards the data packet to the ingress/egress port.

In one embodiment, switch 500 performs the same packet walk for the first (i.e., session setup) and subsequent packets (i.e., session match) associated with a session. For example, upon receipt of a subsequent packet associated with the current session, switch 500 will find a matching session entry in its session table and based on the firewall security device identified within the session entry, switch 500 will forward the data packet to the previously assigned firewall security device for processing.

Continuing with the present example, when a reply packet (b→a) is received by switch 500 at switch port 502b, switch 500 checks its session table again for a matching entry. When switch 500 finds the matching session entry at the switch port 502b for a session from Server B to Client A, switch 500 retrieves the information from the session entry regarding which firewall security device is processing the session. Switch 500 then sends the data packet to that firewall security device. For example, switch 500 finds a matching entry for a session between Server B and Client A at switch port 502b and retrieves information therefrom indicating firewall security device 506a is processing the session. Switch 500 then forwards the reply (b→a) packet to firewall security device 506a for processing.

Firewall security device 506a then processes the reply (b→a) packet and sends it to switch port 502a. Switch 500 then installs a reverse session entry for Client A to Server B at switch port 502a. For example, firewall security device 506a processes the data packet received from the switch port 502b and forwards the data packet to switch port 502a. At the same time, switch 500 also installs a session entry for the Client A to Server B session at switch port 502a.

In this manner, both ports i.e. switch port 502a and switch port 502b have (Client A to Server B) and (Server B to Client A) session entries installed in their session table to forward any subsequent packets associated with those sessions to the same firewall security device. For example, all future transactions between Client A and Server B may be processed through firewall security device 506a. In an embodiment, for switch 502 the session installation is done in hardware and the session setup rate is 7-8 million per second per 10 G port or approximately 60 million per hub blade.

In the context of session closure, the data packet may be a TCP FIN packet. According to one embodiment, when switch 500 receives the TCP FIN packet for a session, switch 500 updates the session entry with a TCP FIN flag. The flag identifies the session for normal closure. When the TCP FIN flag egresses switch 500 at the switch port 502b, switch 500 sets the TCP FIN flag in the reverse session entry. As such, the TCP FIN packet for the Server B to Client A session is updated in the session entries for both switch ports 502b and 502a. In one embodiment, switch 500 closes the session entry only if the FIN flag is set for the ingress direction.

In the context of session closure, the data packet may be a TCP RST packet. According to one embodiment, for TCP RST packets, the session entries for both directions (ingress and egress) are updated and marked for closure.

In some scenarios, the data packet may be an IP fragmented packet. IP fragments are packets that are formed which can pass through a link with a smaller Maximum Transmission Unit (MTU) than the original datagram size. IP fragments do not carry TCP/UDP port numbers. According to one embodiment, in order to load balance the IP fragments of the same original packet, switch 500 uses the first packet of the fragment to install a fragment session entry comprising a source IP address, a destination IP address, a protocol, and a fragment ID. The fragment ID is contained in the fragment packet and it identifies the packets that contain the fragments of the same original packet. Switch 500 uses these fields to uniquely identify a session match for the subsequent fragment packets and processes the fragmented packets of the common fragment ID to the same firewall security device.

It should be noted that although the above mentioned data packet processing has been explained in the context of two switch ports and five firewall security devices, any number of switch ports and firewall security devices may be used as will be appreciated by those or ordinary skill in the art.

In a particular embodiment, switch 500 may be a FORTISWITCH switching card and firewall security devices 506a-e may be FORTIGATE security cards. In such an embodiment, all traffic running through the fabric switch of switch 500 may be controlled by a complex set of content aware (TCAM) routing rules. For traffic to properly pass between the fabric switch and the FPGAs and the security cards, the following convention may be followed in accordance with various embodiments of the present invention:

FORTISWITCH switching card and FORTIGATE security cards: The traffic flows between the 2 cards using a service group model with an additional VLAN ID pair for each service group. These VLAN IDs may be used for communication between the FORTIGATE security cards and the FORTISWITCH FPGAs. In this manner, traffic on the extended VLAN ID can always re-directed to the FPGA. In one embodiment, the service group model is as described by co-pending and commonly owned U.S. Provisional Patent Application No. 61/443,410, which has been previously incorporated by reference herein.

Front Panel ports: Traffic may be processed by double tagging each frame with the appropriate inner and outer tags. TCP and UDP traffic is directed to the appropriate FPGA trunk group and is then delivered to a single FPGA device. Traffic which is not TCP or UDP is sent to a trunk group which contains all the ports in the service group. This trunk group provides basic hashing services for frame types not supported by the FPGA. Alternatively, non-TCP/UDP traffic may be sent to the master firewall device. In one embodiment, an override of selected TCP/UDP traffic is permitted to direct non-load balanced traffic to the master firewall device. This may facilitate handling of protocols not yet supported, for example.

FPGA Ports: The FPGAs perform session lookups and provide load distribution results to the fabric switch. The FPGA swaps the outer tag VLAN ID with a routing tag. This tag uniquely identifies the backplane slot for which the packet needs to be delivered. The fabric switch is then responsible for swapping this routing tag with the original service group tag.

Backplane Slot Ports: Traffic received from the FORTIGATE security cards is either routed out to the appropriate front panel port or to the appropriate FPGA trunk group. Several configuration modes and packet formats control how the traffic is routed from the backplane slot ports. Traffic that is directed to the FPGAs has the outer VLAN ID replaced with the slot steering tag. The FPGA restores the service group VLAN ID when the packet is returned and the fabric switch routes the frame to the appropriate front panel port.

Figure 6:
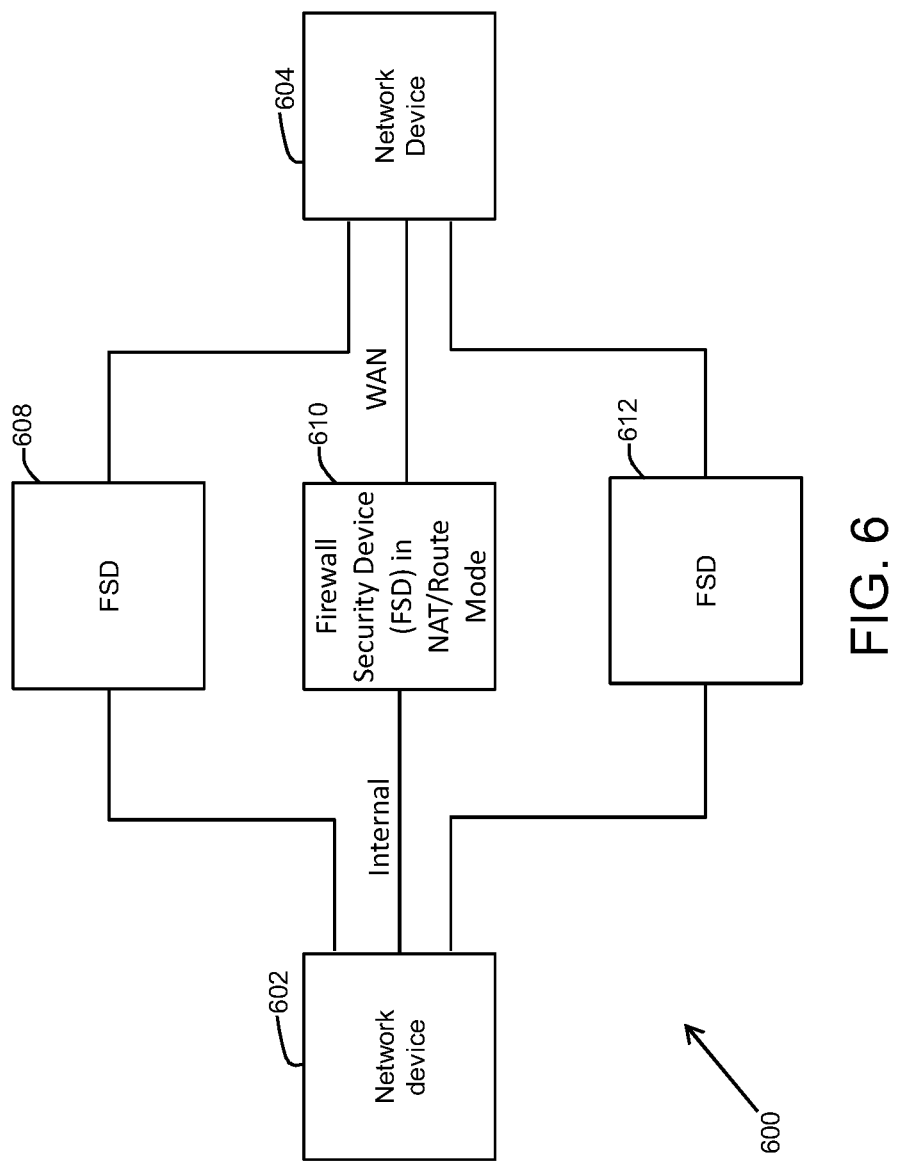
FIG. 6 conceptually illustrates system level data packet processing for a session helper function, according to an embodiment of the present function.

FIG. 6 conceptually illustrates system level data packet processing for a session helper function, according to an embodiment of the present function. According to the present example, system 600 comprises a network device 602, a network device 604, a firewall security device 608, a firewall security device 610, and a firewall security device 612. Network devices 602 and 604 may be connected to the firewall security devices 608, 610 and 612 through a switch hub (not shown). Further, load balancing among the firewall security devices 608, 610 and 612 may be achieved as described above.

The session helper function includes data traffic such as Session Initiation Protocol (SIP), Real Time Streaming Protocol (RTSP), File Transfer Protocol (FTP) etc. For such traffic types, a control session may be used to communicate session parameters of another separate set of media/data sessions. Since the media sessions have different IP addresses and port numbers from the control session, only the destination IP address and port numbers are included in the control session messages.

In an embodiment, the firewall security device that processes the session helper data traffic will install a 3-tuple/pinhole session entry for the expected incoming data/media sessions extracted from the control session messages. A pinhole is a 3-tuple with a destination IP, destination port number and protocol. However, it does not specify the source IP or source port information. The establishment of the pinhole means that packets with those destination addresses and/or port (regardless of the source address/number) are allowed to pass. In an embodiment, there may be provided a special hardware setup mechanism in the switch that snoops the messages in the control session to extract a destination IP address, a destination port number and a protocol type for the pinhole session entry.

In an embodiment, a pinhole entry may be used for both directions. Further, since an Application Layer Gateway (ALG) may also translate addresses in the control session messages due to Network Address Translation (NAT), the snooping of the messages by the switch may occur after the processing by the firewall security device has been done so that the message contains the already translated address and port number. Hence, the addresses in the pinhole entries may not match the addresses and port numbers in the received control messages.

Referring again to FIG. 6, let us assume that network device 602 is a SIP Phone A and network device 604 is a SIP Phone B. SIP Phone A is connected to a switch (not shown) in an internal network and SIP Phone B is connected to a switch (not shown) in a Wide Area Network (WAN). Let us further assume a session containing an invite request is initiated by SIP Phone A to SIP Phone B, with the destination address and the port information for SIP Phone A in the invite request. According to one embodiment, the SIP ALG creates pinhole #1, which accepts traffic on WAN with destination address and port numbers received by SIP Phone B in the message. In addition to the pinhole entry information, the SIP ALG may also contain information regarding the firewall security device processing that session. For example, let us assume that the firewall security device 610 is processing the request. In another embodiment, the SIP ALG also performs source NAT on the invite request and forwards it to SIP Phone B. SIP Phone B replies with a 200 OK response to SIP Phone A. The 200 OK message is a standard response for successful Hypertext Transfer Protocol (HTTP) requests. Further, in an embodiment, the 200 OK message contains the destination address and port number information so that SIP Phone A knows what destination address and port number to use to send media packets to SIP Phone B. Thus, in accordance with one embodiment, the SIP ALG creates pinhole #2, which accepts traffic on the internal network with the destination address and port numbers as the address and port number for SIP Phone B. Further, the SIP ALG performs source NAT on the 200 OK response and forwards it to SIP Phone B. Thus, this exchange of information allows SIP Phone A and SIP Phone B to set up two unidirectional connection for the media/data sessions. SIP Phone B may be able to send RTP and RTCP media sessions to SIP Phone A through pinhole #1 and SIP Phone A may be able to send RTP and RTCP media sessions to SIP Phone B through pinhole #2. In an embodiment, when the data/media session is received at the switch, the pinhole entry is matched, and a 5-tuple session is installed and the data packet is sent to the firewall security device processing those sessions.

Figure 7A:
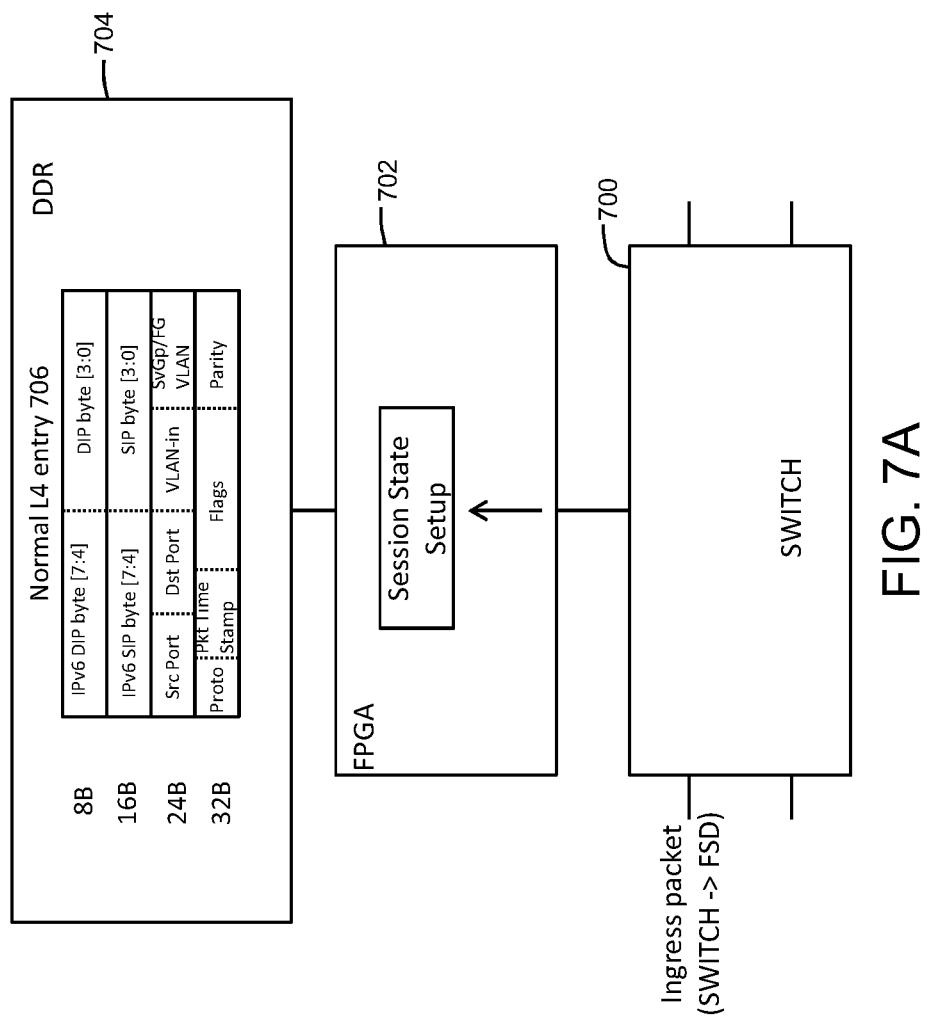
FIGS. 7A, 7B, and 7C show different types of session entries made by a switch in accordance with an embodiment of the present invention.
Figure 7B:
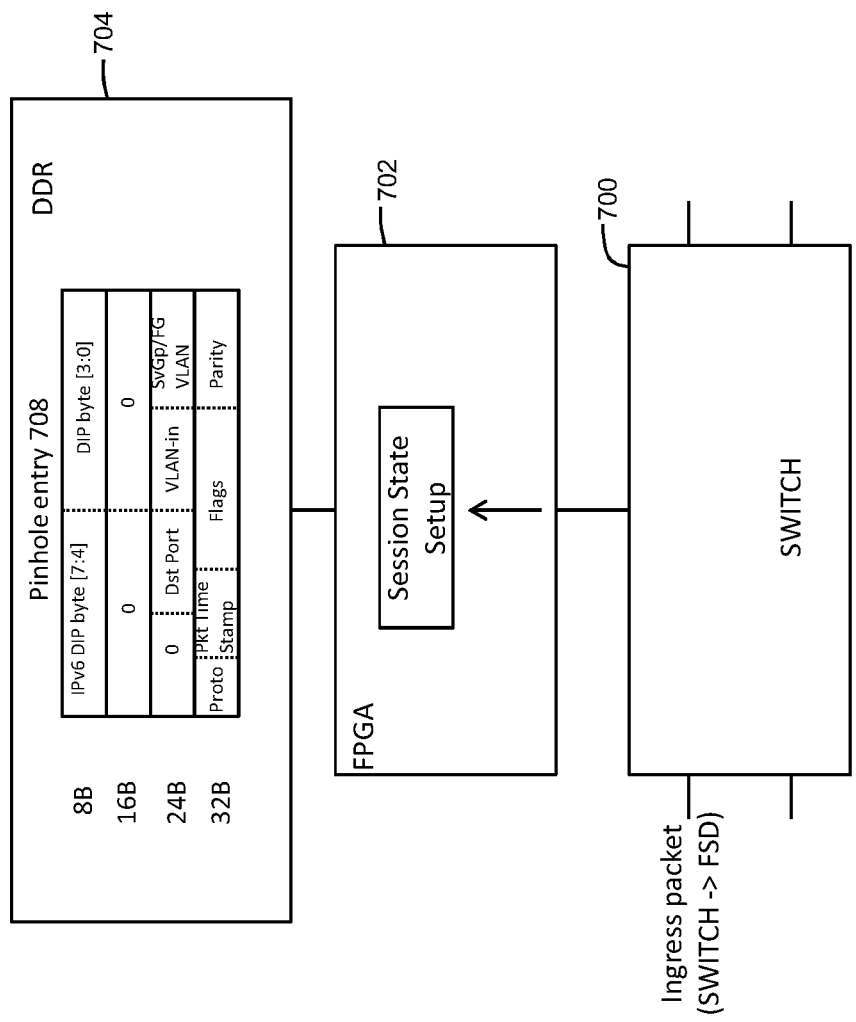
Figure 7C:
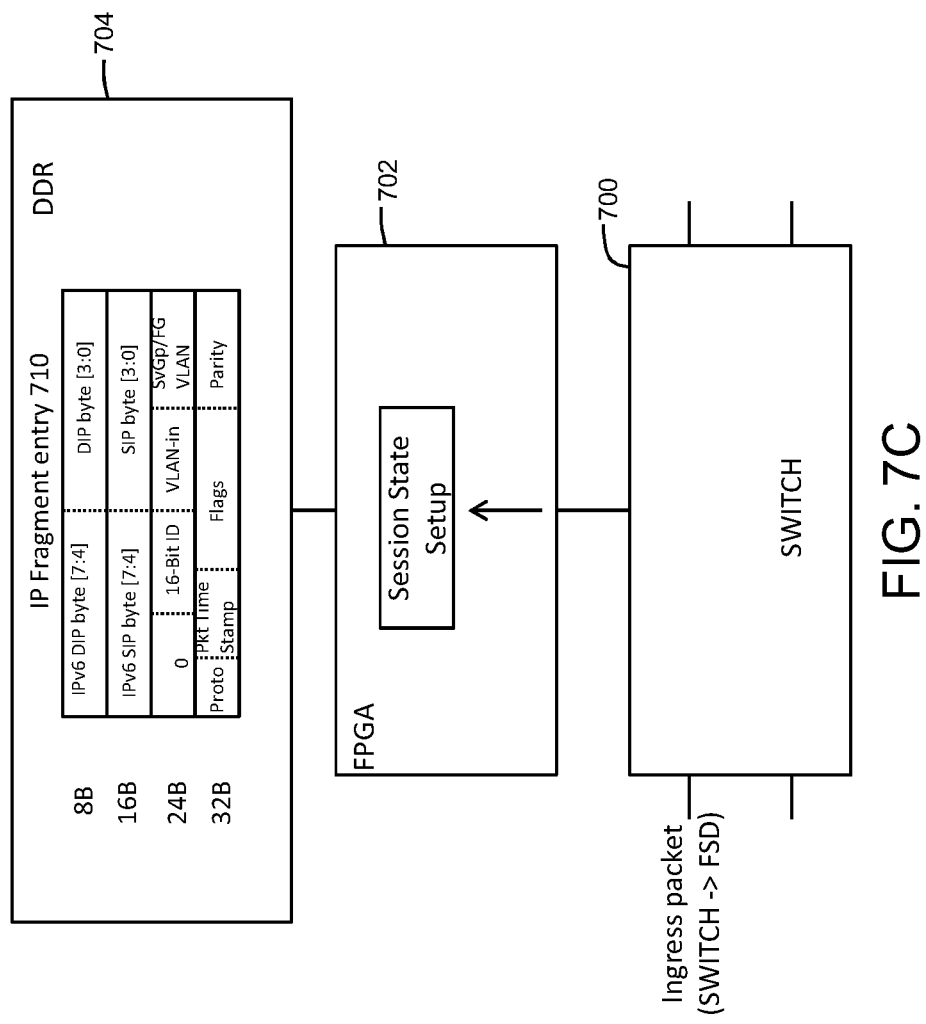

FIGS. 7A, 7B, and 7C show the different types of session entries made by a switch 700 in accordance with an embodiment of the present invention. According to the present example, switch 700 comprises a load balancing unit 702 and a memory unit 704, as explained above. The functions of load balancing unit 702 include performing processing of data packets, selecting a firewall security device and forwarding the data packets to the selected firewall security device. In an embodiment, load balancing unit 702 may also be configured to create session entries for the data packets that ingress and egress switch 700. These session entries are stored in memory unit 704 of switch 700. In an embodiment, each session entry is 32 bytes and includes an IP source address, an IP destination address, a protocol field, a TCP/UDP port numbers and a VLAN ID, if available. The session entry may also contain a service group number and firewall security device slot VLAN tag (i.e., SvGP/FG VLAN), which associates the service group with the firewall security device that is processing that session. In another embodiment, there may also be present a time stamp (e.g., a packet time stamp) which is updated when packets of that session are received. Such time stamps may be used to age out flows, for example, for UDP sessions. Further, the session entry may also include a set of flags, such as, TCP SYN, TCP FIN, TCP RST and TCP ACK, which are used to age out the TCP sessions. In an embodiment, for each FPGA port there are up to 16M session entries available.

Failover generally refers to the capability to switch over automatically to a redundant or standby server, system, or network upon the failure of abnormal termination of a previously active application, server, system, or network. According to one embodiment, to support various failover scenarios, FPGA 702 of load balancing switch 700 performs session synchronization between an active and a standby blade/port. In one embodiment, only those sessions for which a VLAN ID in a session entry is different from that which would be selected by a load distribution algorithm are synchronized. This reduces the number of sessions that need to be synchronized for those load distribution algorithms that are based on the packet headers (IP address and TCP/UDP port based hashes).

In an embodiment, a background task runs in FPGA 702 for each 10 G port that sequentially examines all session entries (e.g., approx. 16M to 32M session entries) in memory periodically (e.g., every 4 to 12 seconds). This is known as the scrubbing function. This scrubbing function compares the current time stamp and the timestamp when the last packet for that session was received. The timeout or age timer is determined based on the TCP flags and FPGA 702 sets an invalid flag in the session entry. In another embodiment, as part of each session entry check, the scrubbing function also checks a flag to see if that session entry needs to be synchronized to its standby port. This flag is set by FPGA 700 whenever there is a mismatch between the VLAN in the session entry and the VLAN retrieved by the load distribution algorithm.

A sync packet is a special Ethernet packet which is sent to a companion standby port. The companion standby port performs a normal session entry installation either in a primary session table or an overflow session table, which is described further below with reference to FIG. 8.

In an embodiment, in an High Availability (HA) cluster, there are two failover cases that are supported. In an embodiment, there is a switch chassis to chassis redundancy. In such a case, the active and standby chassis are identical and identically configured. The sessions on the active chassis (only those that need to be synchronized) can be synchronized to the standby chassis. The synchronization packets can be sent either via the fabric switch to the base switch of the active chassis to the base switch to the fabric switch of the standby chassis. The synchronization packets could also be sent via any port on the hub blade depending on the software configuration of the switch.

In another embodiment, there occurs an intra-chassis failover case between two hub blades of a load balancing switch. In this case, the synchronization packets are sent on the backplane to the standby hub blade.

FIG. 7A shows an exemplary normal Layer 4 (L4) session entry 706. In the present example, normal L4 session entry 706 contains the 5-tuple fields, which include a source IP address, a destination IP address, a protocol field, a source port number (e.g., a TCP source port, a UDP source port or an L4 source port number found in the transport layer header) and a destination port number (e.g., a TCP destination port, a UDP destination port or an L4 destination port number found in the transport layer header). In an embodiment, the session entries are installed into the session table by load balancing unit 702 using packet header fields associated with an egress packet. Load balancing unit 702 reverses the source and destination fields in the packet and installs the 5-tuple fields into the session table. Load balancing unit 702 also saves a VLAN tag (e.g., composed of a service group, and a firewall security device slot) into the session table. Further, the egress packet may be redirected to its respective FPGA port. In an embodiment, various fields in a packet header, such as, TCP SYN, TCP FIN, and TCP RST flags may be used to redirect egress packets to the respective FPGA port. In another embodiment, the firewall security device that processes the data packet marks the egress packet. This marking signals to switch 700 that a reverse session entry with this packet needs to be installed.

FIG. 7B shows an exemplary pinhole entry 708. According to the present example, pinhole entry 708 comprises the 3-tuple fields of a session and includes a destination IP address, destination port number and the protocol field. The pinhole entry type of session entry is used to process session helper cases where only the destination fields of the corresponding data/media session are known, for example. In one embodiment, firewall security devices (e.g., firewall security devices 106a-b) may send special session setup packets to load balancing unit 702. These special packets contain the session fields of the packet header that are used to install pinhole entry 708.

FIG. 7C shows an exemplary IP fragment entry 710. According to the present example, IP fragment entry 710 comprises the 3-tuple fields of a session and includes a source IP address, a destination IP address and a protocol field. In addition, a fragment ID is also used to identify and associate a particular fragmented packet with other fragments of the same packet. In an embodiment, the 3-tuple fragment entry is used to associate the IP fragmented packets with their 5-tuple session entry. The IP fragment entry type of session entry is used when a load distribution algorithm is such that fragments and their 5-tuple sessions may be sent to different firewall security devices. In an embodiment, the ingress packet is used to install the IP fragment session entry since the load distributor algorithm could send subsequent packets of the same original packet, to a different firewall security device.

Figure 8:
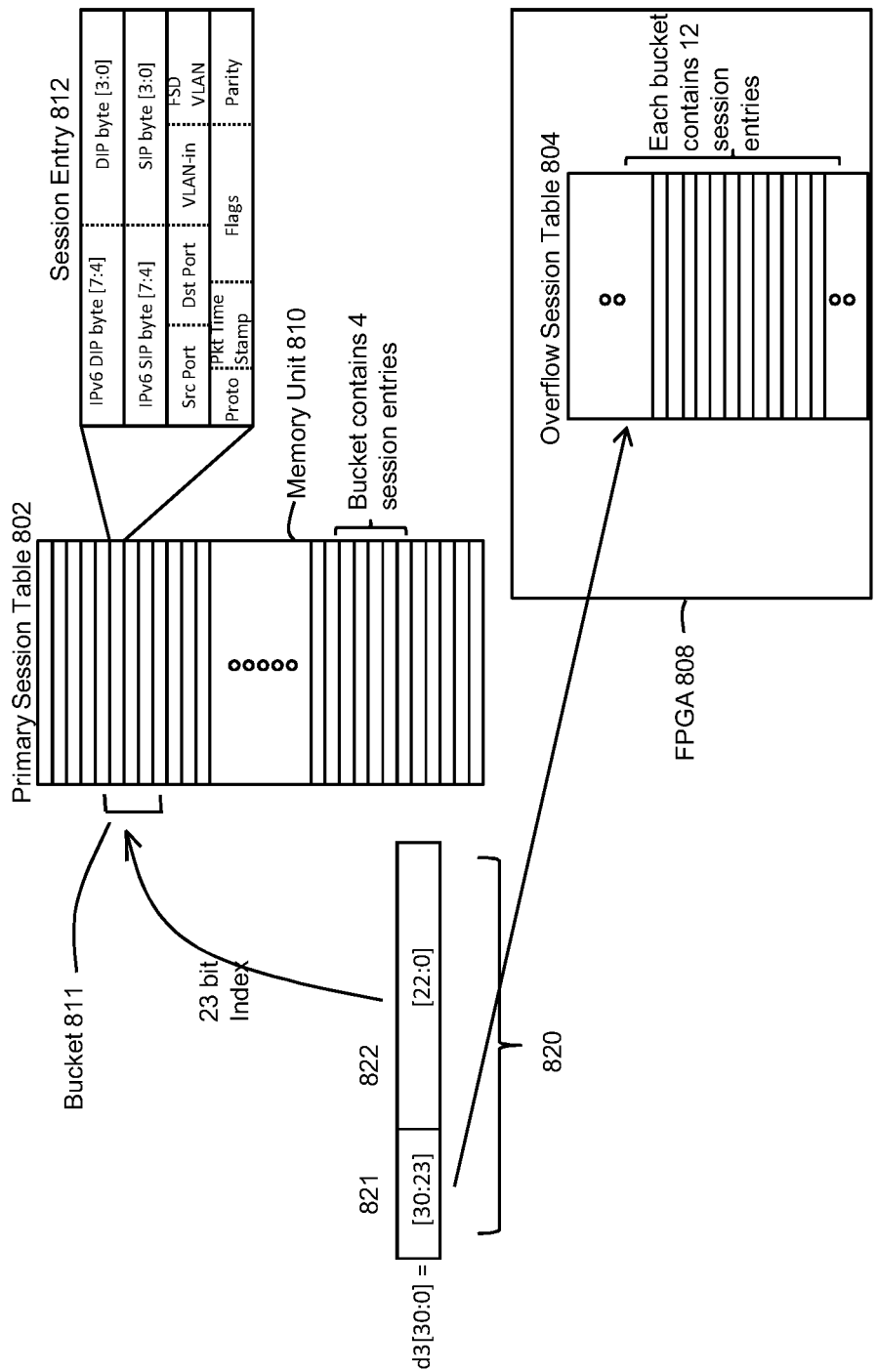
FIG. 8 illustrates a session table stored in a switch in accordance with an embodiment of the present invention.

FIG. 8 illustrates a session table architecture that may be stored in a session aware load balancing switch in accordance with an embodiment of the present invention. In the present example, the session table architecture comprises a primary session table 802 and an overflow session table 804. In one embodiment, primary session table 802 is kept in memory unit 810 (e.g., DDR3 SDRAM), which is attached to a load balancing unit 808 (e.g., one or more FPGAs). In one embodiment, overflow session table 804 is kept within the FPGA using an internal SRAM memory of the FPGA, for example. Such a configuration enables fast and efficient session entry searches by the FPGA.

According to one embodiment, when a data packet is received at the switch (not shown), the FPGA parses the data packet and retrieves the 5-tuple fields and a VLAN tag. The FPGA then creates four 30-bit registers with the extracted fields and performs a non-linear hash composed of shifts and additions on those four registers to produce a 30-bit value 820. This hash mechanism may be implemented such that a single bit change results in a large change in the resulting hash and produces a more randomized index. The FPGA uses a 23 bit portion 822 of the hash result 820 to index into primary session table 802, and retrieves a 128-byte bucket 811 that contains four 32-byte session entries (such as session entry 812). In an embodiment, there are 8M buckets (23 bits) per 10 G port or 32M (4 session entries per bucket) session entries per 10 G port. Further, the FPGA performs an exact match between the four session entries and the extracted 5-tuple fields of the data packet to determine if a matching session entry is one of the four stored in that bucket.

The FPGA may use a different 8 bit portion 821 from the 30-bit hash 820 to index into overflow session table 804. In an embodiment, overflow session table 804 contains 256 buckets (8-bit index), with each bucket containing 12 session entries for a total of 3K overflow session entries per 10 G port. According to one embodiment, for the internal overflow session bucket, the FPGA performs an exact match between the 12 session entries and the extracted 5-tuple fields to determine if there is a matching session entry in that overflow bucket. In one embodiment, there are 12 session entries stored in the overflow bucket because the FPGA RAM table access is much faster than the external DDR3 memory access. Further, in an embodiment, session entries in overflow session table 804 are entries that resulted in a hash collision (e.g., more than four sessions matched into a bucket) in primary session table 802.

In an embodiment, when the bucket 811 to which a 23-bit index points in primary session table 802 is full, the FPGA uses a different set of 8 bits 821 from the hash 820 to index into overflow session table 804 and hence installs a session entry in the overflow table 804. As the internal overflow table 804 is small (maximum supportable by the memory available on the FPGA), whenever there is space available in the primary table 802 (may be because of session entries being aged out), the FPGA moves a session entry from the overflow table 804 to the primary table 802. Thus, the overflow table 804 is sparsely populated because of the constant movement of session entries from the overflow table 804 to the primary table 802.

It should be noted that though in the above mentioned example, the session table has been shown to be partly residing in the primary table and partly on the overflow table, other embodiments are also possible in which the session table may reside completely outside the FPGA i.e. in the primary table or completely inside the FPGA i.e. in the overflow table.

In addition, there runs a background task at the FPGA that sequentially examines all of the session entries per FPGA port and utilizes approximately 3% of the DDR memory bandwidth. In an embodiment, where the data packet is a TCP packet, the TCP flags or UDP protocol type and the timestamp recorded in the session entry (indicating the time that a packet of a session was last received), is used to determine how to age that session. The TCP and UDP aging defaults correspond to timer settings. In an embodiment, a default for a normal case for TCP (with SYN and ACK flags set for the ingress and egress direction) is set to 1800 seconds. When a TCP RST flag is set in a received packet (in either ingress or egress direction), the time out interval is default to 120 seconds. This interval is typically set shorter to 10 seconds by subsequent configuration.

In another embodiment, when TCP FIN flag is set in the received packet, then the session is considered half closed and the interval to age is default to 120 seconds. In such an embodiment, the session in the reverse direction is aged at the normal TCP interval until a FIN flag is set for a packet in that direction.

In still another embodiment, when a TCP SYN packet is set (in either ingress or egress direction), but there is not a corresponding SYN and/or ACK flag, then that session is considered as half open and the age interval is default to 60 seconds. In another embodiment, for a UDP session, the default age timer is set to 180 seconds.

It should be noted that only exemplary embodiments are stated above, and the default values can be set to other values.

Figure 9:
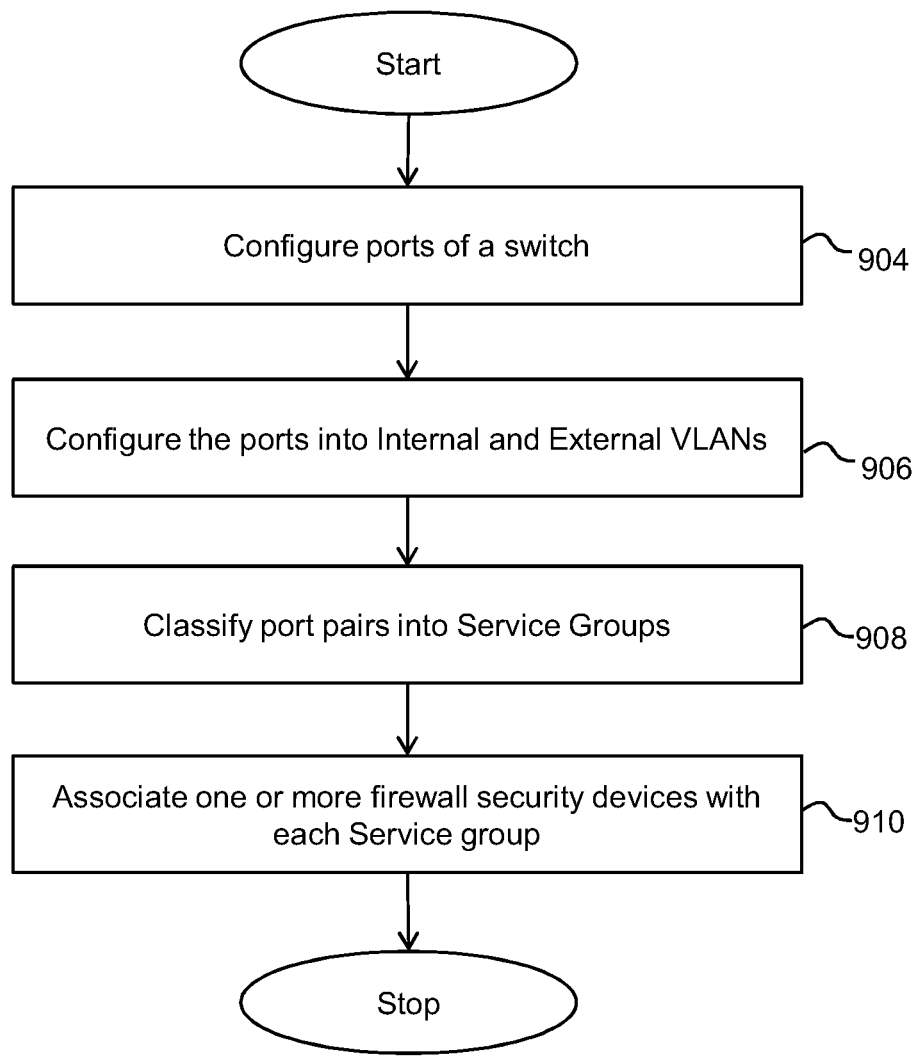
FIG. 9 is a flow diagram illustrating front panel and fabric slots to VLAN mappings in a switch in accordance with an embodiment of the present invention.

FIG. 9 is a flow diagram illustrating front panel and fabric slots to VLAN mappings in a switch, such as the switch 108 in accordance with an embodiment of the present invention. Depending upon the particular implementation, the various process and decision blocks described in connection with this and other flow diagrams may be performed by hardware components, embodied in machine-executable instructions, which may be used to cause a general-purpose or special-purpose processor programmed with the instructions to perform the steps, or the steps may be performed by a combination of hardware, software and firmware.

At block 904, the front panel ports of a switch (e.g., switch 108) are configured and grouped together for related internal and external networks. According to one embodiment, there are 3 possible configurations: single port pairs, 2-port LAG pairs and 4-port LAG port pair, as explained in FIG. 4B. In another embodiment, 8 to 16 independent ports can be supported in a single or dual controller mode as described above.

At block 906, the port pairs are classified into internal and external VLANs. The internal and external networks may correspond to private (internal) and public (external) customer networks, respectively. In a switch having 8 front panel ports, for a single port pair, there are up to four internal/external ports. In 2-port LAG mode, there are up to two internal/external port pairs and for a 4-port LAG mode, there is a single internal/external port pair.

At block 908, the internal/external VLAN pairs are classified into one or more service groups, as described earlier with reference to FIG. 4B, for example. One or more firewall security devices are then associated with the one or more service groups, at block 910. This block identifies a set of firewall security devices that are used to process all incoming/outgoing data traffic to/from the front panel ports of the switch.

Figure 10:
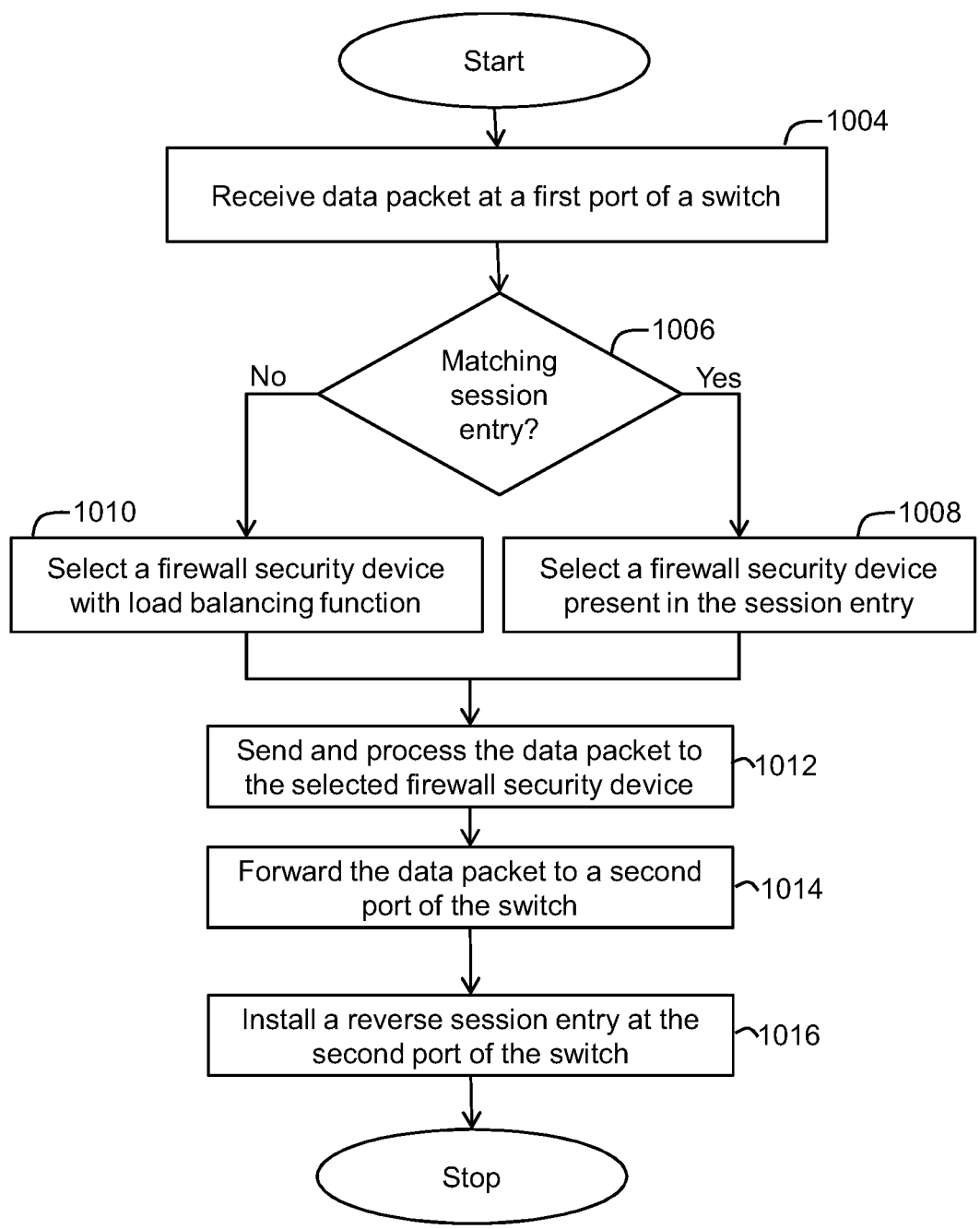
FIG. 10 is a flow diagram illustrating a method to balance load among a plurality of firewall security devices in accordance with an embodiment of the present invention.

FIG. 10 is a flow diagram illustrating a method to balance load among multiple firewall security devices in accordance with an embodiment of the present invention.

At block 1004, a data packet is received at a first port of a switch (e.g., switch 108). The data packet may be a TCP or UDP packet, for example. However, the invention is not restricted to such types of data packets. The data packet may be sent by a client device to a destination device (e.g., a server device), both directly or indirectly connected to different ports of the switch. In an embodiment, the client device is connected to the first port of the switch and the destination device is connected to a second port of the switch.

At decision block 1006, the switch determines whether there exists a matching session entry match from the client device to the destination device in its session table. If the switch finds the session entry match at step 1006, then processing continues with block 1008; otherwise processing branches to block 1010.

At block 1008, having identified a matching session entry for the received packet, the switch selects a firewall security device from the matching session entry to process the data packet.

At block 1010, having not identified a matching session entry for the received packet, the switch uses a load balancing algorithm to select one of the multiple firewall security devices.

At block 1012, the switch sends the data packet to the selected firewall security device for processing. The data packet is then forwarded to the second port of the switch at block 1014. At block 1016, if this is the first packet of the session, the switch installs a reverse session entry from the destination device to the client device at the second port and also indicates in the reverse session entry which firewall security device has been selected to process that session.

In this manner, all packets associated with a particular session can be processed by the same firewall security device. For example, when a reply data packet is received at the second port, the switch again checks the session table for a matching entry. On finding the match, the switch forwards the reply data packet to the firewall security device previously stored in the session entry at block 1016. After processing the reply data packet by the firewall security device, the switch then forwards the reply data packet to the first port. Further, the switch installs a second reverse session entry from the client device to the destination device at the first port.

As described above, in one embodiment, the switch uses a load balancing algorithm to select a firewall security device for processing of the data packets associated with a particular session. Three primary load balancing algorithms that may be used include, but are not limited to, a round-robin load balancing algorithm, use of asymmetric hash of the IP source and destination addresses, and use of asymmetric hash of the IP source and destination addresses and TCP/UDP source and destination port numbers. In the context of the hash-based approaches, the result of the hash is used to index into a table containing the VLAN used to direct the packet to the firewall security device and the encoded service group ID.

For the IP source and destination address hash, an XOR function may be used so that the hash is symmetric. This means that the source and destination IP addresses can be reversed and the resulting hash will be the same. Since, the subsequent packets of the same session results in the same hash result, the packet is sent to the same firewall security device as previous packets of the session and hence ingress session entries are not installed. Further, as this load balancing mechanism uses only IP addresses, the hash results for fragmented packets are also the same.

In one embodiment, the IP source and destination address (layer 3) and TCP/UDP port field (layer 4) hash is also symmetric. For this hash mechanism, subsequent packets of the same session result in the same hash result, hence sessions are not installed at the ingress port. However, in such a case fragmented packets would result in a different hash, since only 3 of the 5 packet header fields are available in the fragmented packet. Hence, a fragment session entry is installed.

In the context of the round-robin load balancing mechanism, the index may be incremented each time a packet is received. By using an indirect table lookup, the VLANs in the table can be weighted so that some VLANs occur more often than others and VLANs can be added or deleted by over writing VLAN entries in the table.

For the round robin mechanism, a load distributor may cycle through all of the VLAN IDs in the lookup table. This provides an even distribution for the firewall security device. To avoid subsequent packets of the same session being sent to a different firewall security device, session state may be installed concurrently with the receipt of the ingress packet.

Figure 11A:
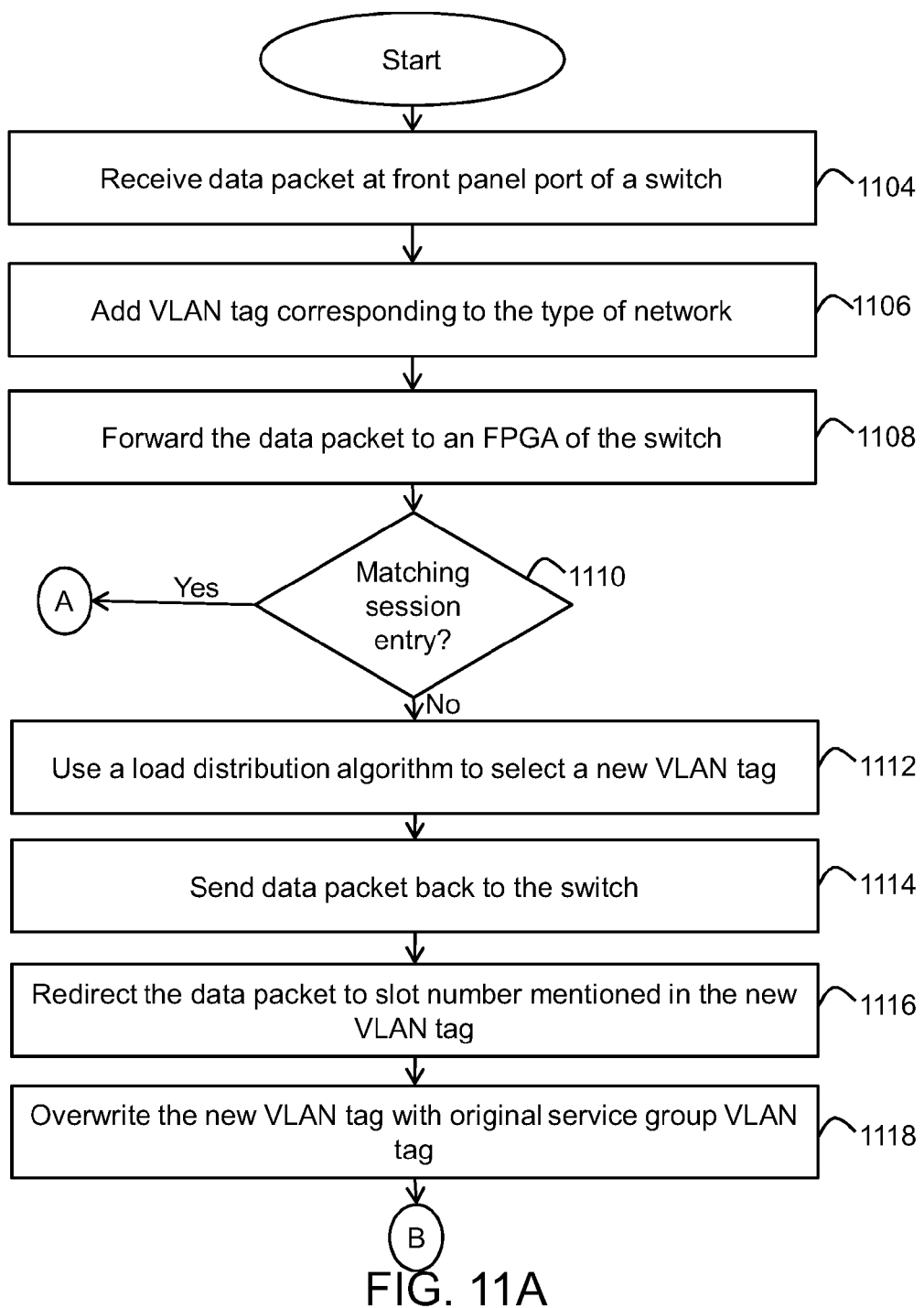
FIGS. 11A and 11B collectively represent a flow diagram illustrating a detailed method to balance load among a plurality of firewall security devices in accordance with an embodiment of the present invention.
Figure 11B:
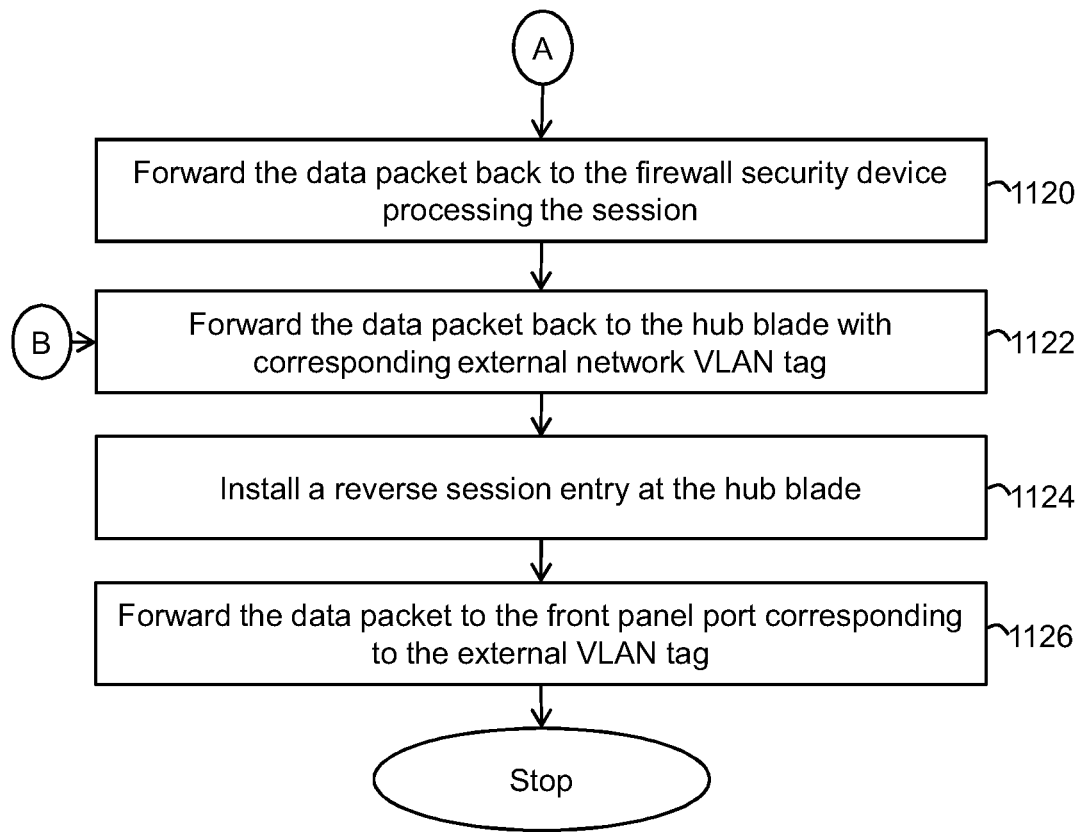

FIGS. 11A and 11B collectively represent a flow diagram illustrating a detailed method to balance load among multiple firewall security devices in accordance with an embodiment of the present invention.

At block 1104, a data packet is received at the front panel port of a session aware load balancing switch (e.g., switch 108). A first VLAN tag corresponding to the type of network (internal or external) is added to the data packet at block 1106.

At block 1108, the data packet is forwarded to an FPGA of the switch. When the FPGA receives the data packet, it checks its session table at decision block 1110 and determines whether there exists a matching session entry. If the FPGA does not find a matching session entry, then processing continues with block 1112; otherwise processing branches to block 1120 of FIG. 11B.

At block 1112, the FPGA uses a load balancing algorithm, such as that described above with reference to FIG. 10, for example, to select a new VLAN tag to be associated with the data packet. The selected VLAN tag translates to a slot ID (a particular firewall security device to which the data packet should be forwarded) and a Service Group number.

At block 1114, the FPGA sends the data packet back to the switch and at block 1116 the switch redirects the data packet to the slot number identified by the second VLAN tag for data processing by the associated firewall security device. Simultaneously, the FPGA also overwrites the second VLAN tag with the original service group VLAN tag, at block 1118. After block 1118, processing continues with block 1122 of FIG. 11B.

At block 1120, a data packet is being processed for which a matching session entry was determined to exist at decision block 1110. As such, at block 1120, the FPGA forwards the data packet to the previously assigned firewall security device, which is identified within the matching session entry.

At block 1122, the data packet has been processed by a firewall security device and is now forwarded back to the hub blade with the corresponding external network VLAN tag.

At block 1124, the switch installs a reverse session entry at the hub blade (where the firewall security device is interfaced with the switch). The data packet is then forwarded back to the front panel port corresponding to the external VLAN tag, at block 1126.

Figure 12A:
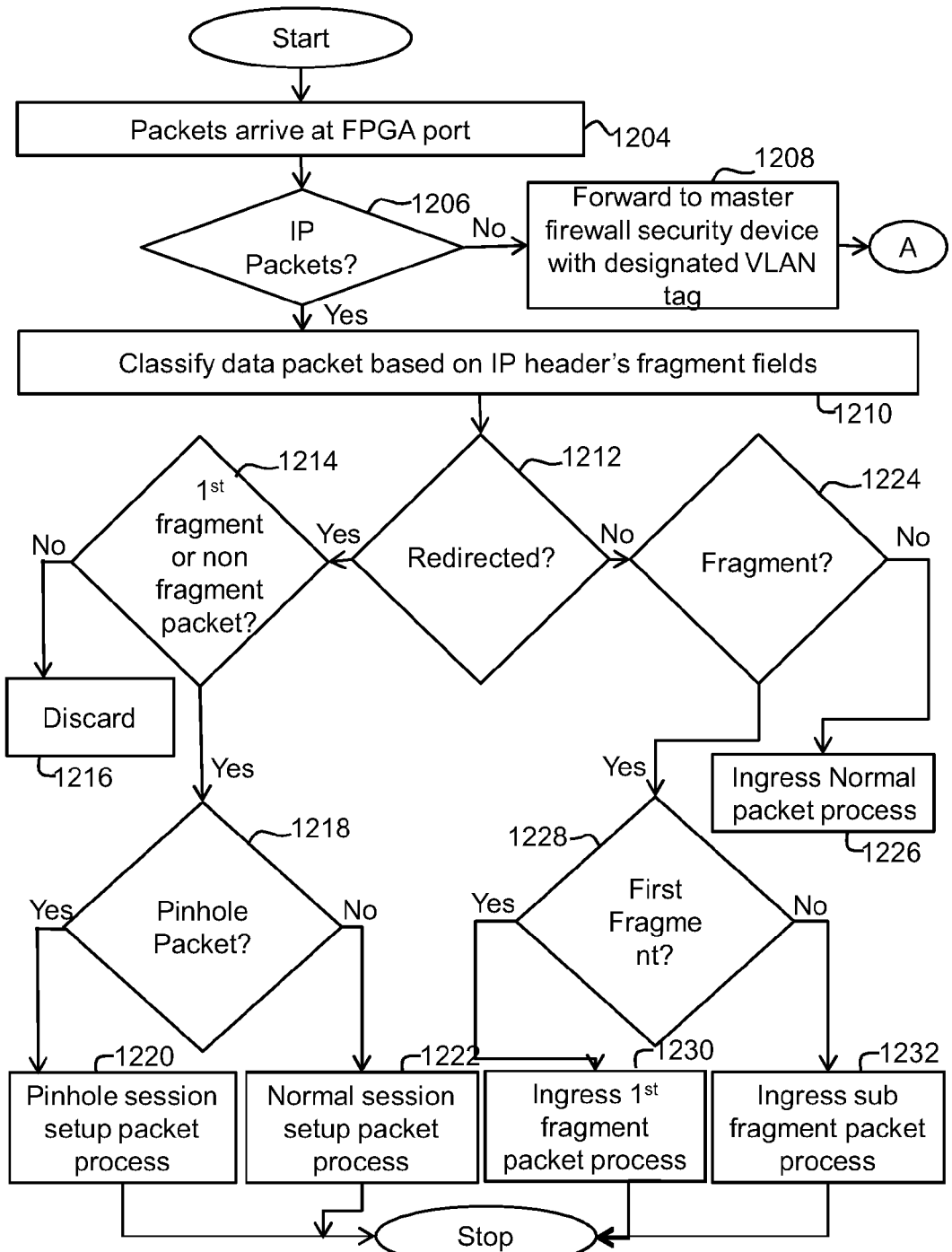
FIGS. 12A and 12B collectively represent a flow diagram illustrating the process flow for different types of data packets in accordance with various embodiments of the present invention.
Figure 12B:
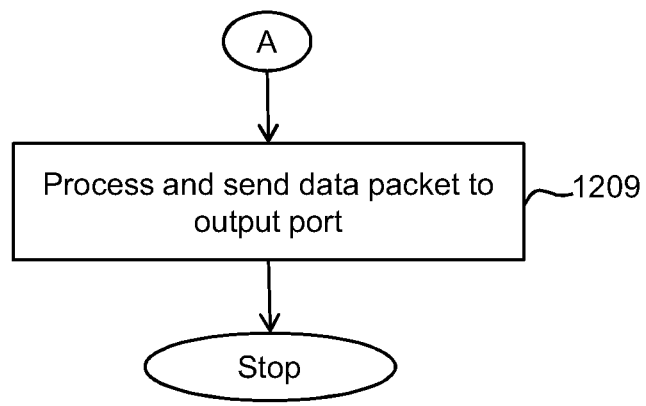

FIGS. 12A and 12B collectively represent a flow diagram illustrating the process flow for different types of data packets, in accordance with various embodiments of the present invention.

At block 1204, a data packet arrives at the FPGA port. The FPGA port determines at decision block 1206 whether the data packet is an IP packet (a TCP or UDP packet). Data packets that arrive at the FPGA port may be initially filtered by the line card switch ASIC. Hence, only TCP or UDP packets may be expected at the FPGA port for load balancing process by the FPGA. If at block 1206 it is determined that the data packet is TCP or UDP, then processing continues with block 1210; otherwise processing branches to block 1208.

At block 1208, the FPGA has determined that the data packet at issue is not an IP packet, therefore the data packet is forwarded to a master firewall security device with a designated VLAN tag. At block 1209, the master firewall security device then processes and further sends the data packet to the intended output port.

At block 1210, the FPGA has determined that the data packet at issue is an IP packet, therefore, the FPGA classifies the data packet based on the IP header's fragment fields and direction bit in the group table.

At decision block 1212, the FPGA checks if the data packet is redirected. If the data packet is found to be redirected, then processing continues with decision block 1214; otherwise processing branches to decision block 1224. In one embodiment, identified packets may be redirected through the FPGAs on egress and the FPGA hands the packet back to the switch and the packet is sent out the front port.

At decision block 1214, the data packet at issue is checked to determine if it is a first fragment or a non-fragment packet. If the data packet is not found to be the first fragment or a non-fragment packet, then it is discarded at block 1216; however, if at block 1214 it is determined that the data packet is the first fragment or a non-fragment packet, then processing continues with decision block 1218

At block 1218, the FPGA determines if the data packet is an egress pinhole setup packet. If the data packet is an egress pinhole setup packet, then at block 1220 an egress pinhole session setup packet process occurs; otherwise at block 1222 a normal session setup packet process occurs.

At decision block 1224, the FPGA has determined that the data packet at issue is not redirected, therefore, the FPGA determines if the data packet is a fragment of an original data packet. If the data packet is not a fragment, then an ingress normal packet process occurs at block 1226 (an example of such a process is described further below with reference to FIG. 13). Alternatively, if at decision block 1224, it is determined that the data packet is a fragment, then processing continues with decision block 1228.

At decision block 1228, the FPGA determines if the data packet at issue is the first fragment. If the data packet is the first fragment, then at block 1230, an ingress first fragment packet process occurs (an example of such a process is described further below with reference to FIG. 14). Alternatively, if at decision block 1228, it is determined that the packet at issue is not a first fragment, then at block 1232, an ingress subsequent fragment packet process occurs (an example of such a process is described further below with reference to FIG. 15).

Figure 13:
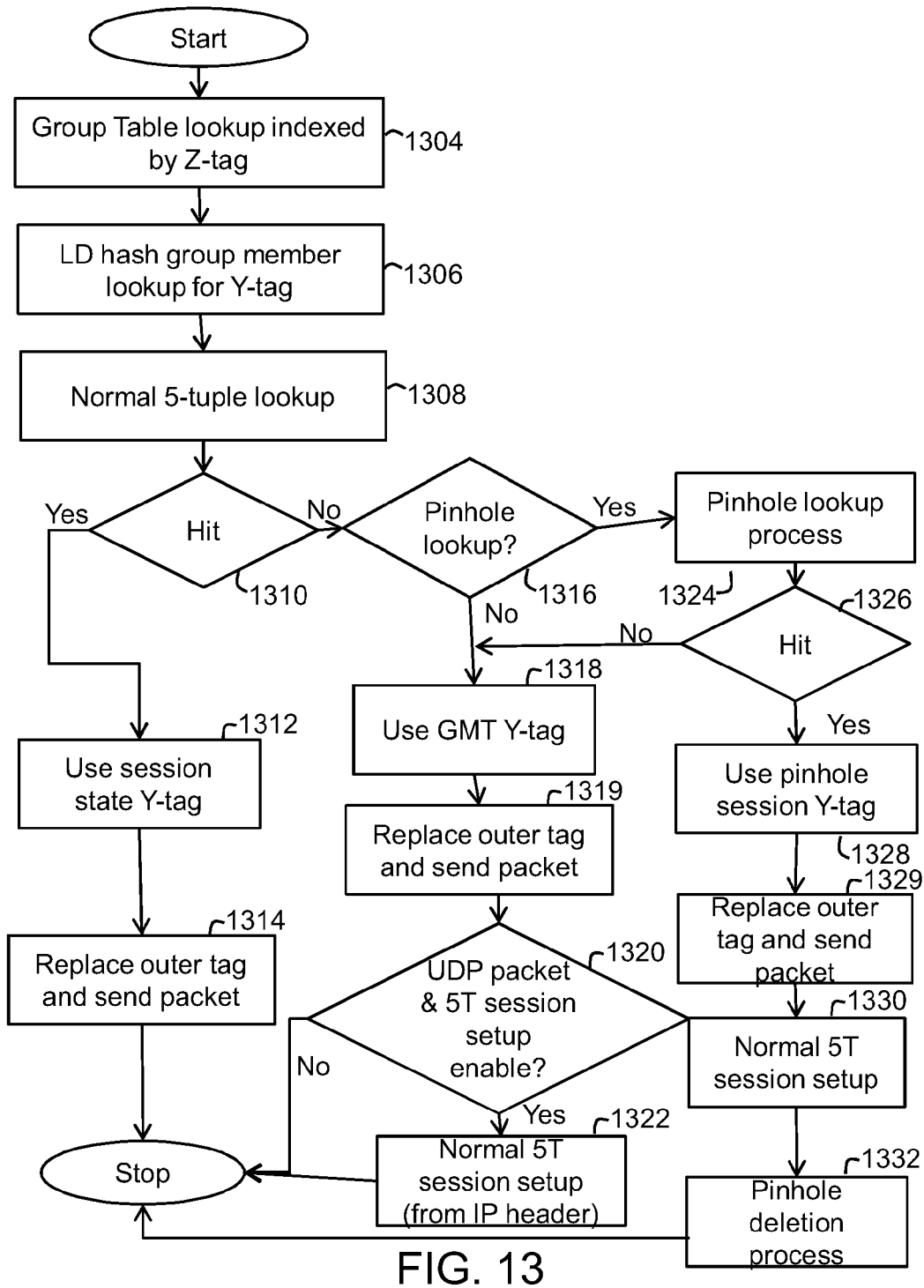
FIG. 13 is a flow diagram illustrating an ingress normal packet process flow in accordance with an embodiment of the present invention.

FIG. 13 is a flow diagram illustrating an ingress normal packet process flow in accordance with an embodiment of the present invention.

At block 1304, a group table lookup is indexed by the Z-tag (i.e., the service group VLAN tag) as explained with reference to FIG. 11, for example. At block 1306, a load distribution hash group member lookup is performed for the Y-tag (i.e., the new VLAN tag) as explained with reference to FIG. 11, for example. The FPGA then checks for a matching normal 5-tuple lookup at block 1308. If a hit is found at decision block 1310, then at block 1312 the FPGA uses the session state Y-tag to process the data packet. At block 1314, the FPGA replaces the outer tag to the data packet and sends the data packet back.

However, if at decision block 1310, a hit is not found, then at decision block 1316, the FPGA determines whether there exists a matching pinhole session entry by performs for a pinhole lookup. If the FPGA does not go for a pinhole lookup, then at block 1318, the FPGA uses the group member table Y-tag to process the data packet. At block 1319, the FPGA replaces the outer tag and sends the data packet. Further, the FPGA may check if the switch is UDP packet and 5-T session setup enabled, at block 1320. If the switch is enabled, then at block 1322 a normal 5-T session setup (from the IP header) takes place.

If at block 1316, the FPGA goes for a pinhole lookup, then the pinhole lookup process takes place at block 1324. If a hit is found at block 1326, then at block 1328, the FPGA uses the pinhole session Y-tag for the processing of the data packet. At block 1329, the FPGA replaces the outer tag and sends the data packet back. Further, the FPGA may also setup a normal 5-T session entry from the pinhole session information, at block 1330. After the 5-T session entry is made from the pinhole session, the FPGA deletes the pinhole session at block 1332.

Figure 14A:
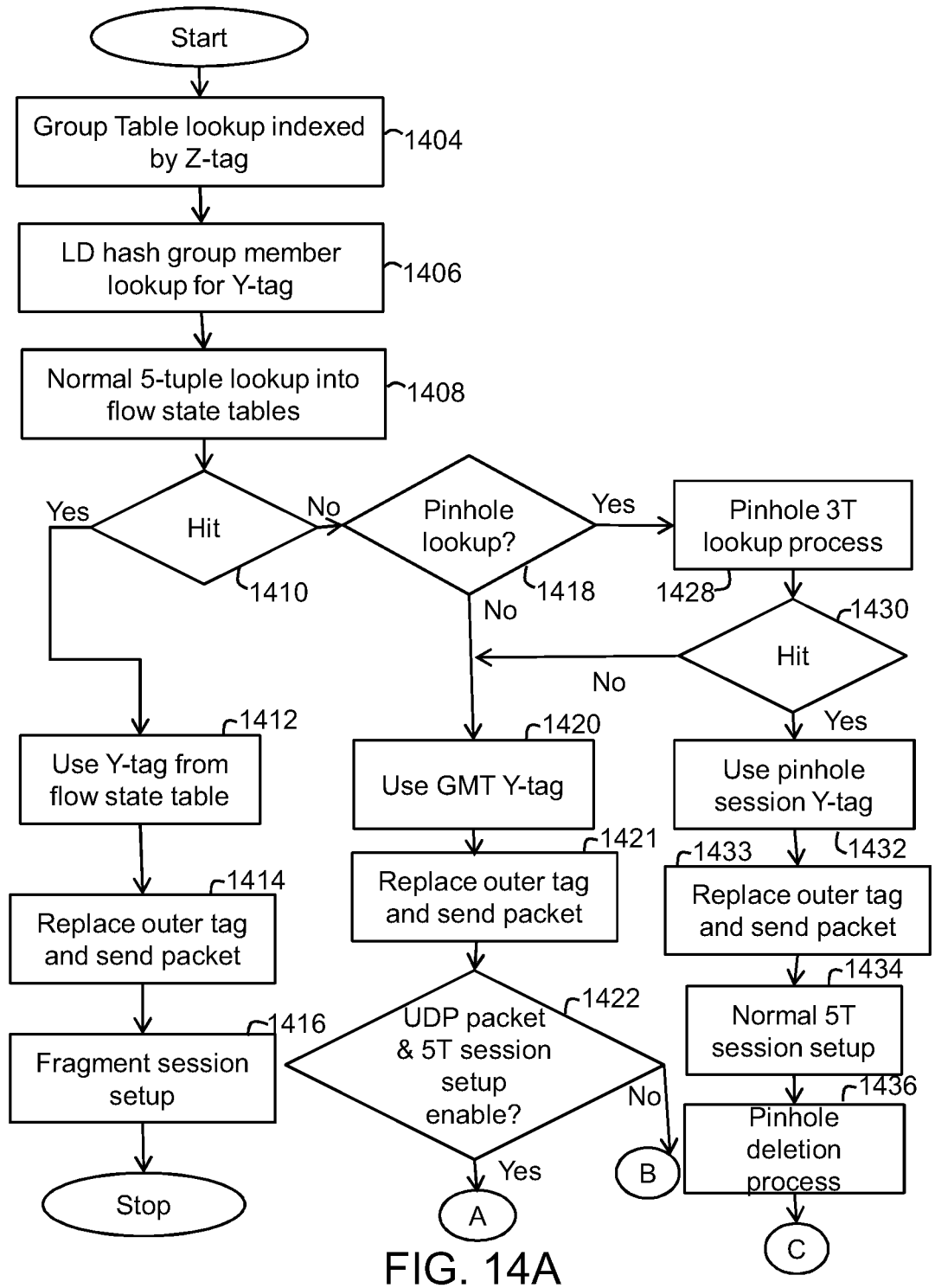
FIGS. 14A and 14B collectively represent a flow diagram illustrating an ingress first fragment packet process flow in accordance with an embodiment of the present invention.
Figure 14B:
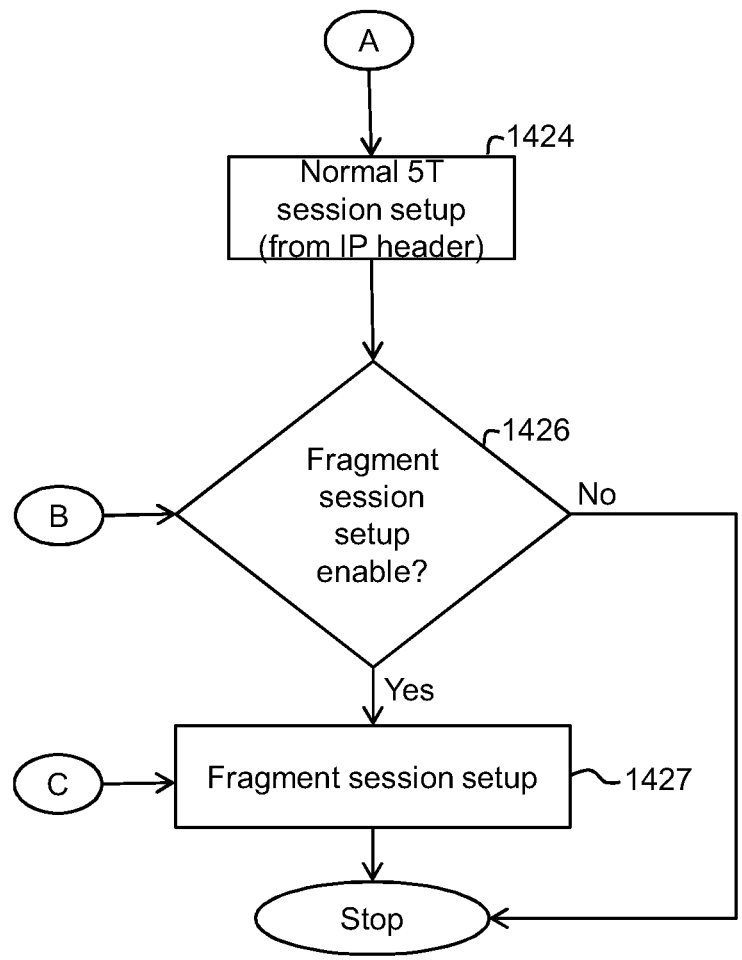

FIGS. 14A and 14B collectively represent a flow diagram illustrating an ingress first fragment packet process flow in accordance with an embodiment of the present invention.

At block 1404, a group table lookup is indexed by Z-tag (i.e., the service group VLAN tag) as explained with reference to FIG. 11, for example. At block 1406, a load distribution hash group member lookup for Y-tag (i.e., the new VLAN tag) as explained with reference to FIG. 11, for example. The FPGA then checks for a matching normal 5-tuple lookup into flow state tables (session state tables) at block 1408. If a hit is found at block 1410, then the FPGA uses the Y-tag from the flow state table, at block 1412, to process the data to a firewall security device mentioned in the flow state table. The FPGA then replaces the outer tag at block 1414. Further, the FPGA sets up a fragment session entry at block 1416.

However, if a hit is not found at block 1410, then at block 1418, the FPGA checks if the pinhole needs to be looked up. If not, then the FPGA uses the Y-tag from the group member table lookup at block 1420. At block 1421, the FPGA also replaces the outer tag and sends the data packet back. Further, at block 1422, the FPGA checks if the switch is UDP and 5-T session setup enabled. If yes, then at block 1424, the FPGA sets up a normal 5-T session. If not, then at block 1426, the FPGA checks if the switch is fragment session setup enabled. If yes, then the FPGA sets up the fragment session.

At block 1418, the FPGA finds that the pinhole needs to be looked up, then at block 1428 the FPGA runs the pinhole 3-T lookup process. If a hit is found at block 1430, then at block 1432, the FPGA uses the Y-tag from the pinhole session to process the data packet. Further, at block 1433, the FPGA replaces the outer tag and sends the data packet back. After using the Y-tag from the pinhole session, at block 1434, the FPGA sets up a normal 5-T session entry and at block 1436 deletes the pinhole session entry. The fragment session is then set up. At block 1430, if a hit is not found then the process gets redirected to block 1420 and further processing occurs as stated above.

Figure 15:
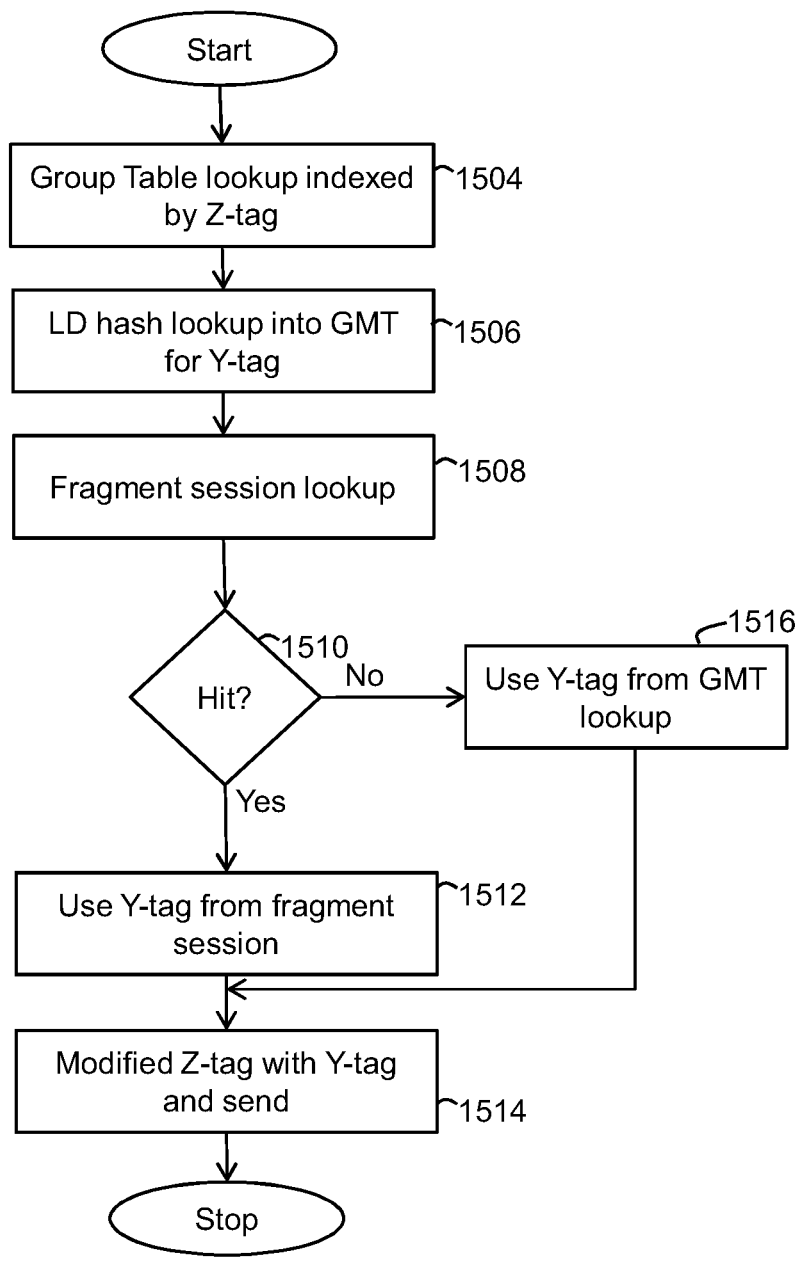
FIG. 15 is a flow diagram illustrating an ingress subsequent fragment packet process flow in accordance with an embodiment of the present invention.

FIG. 15 is a flow diagram illustrating an ingress subsequent fragment packet process flow in accordance with an embodiment of the present invention.

At block 1504, a group table lookup is indexed by Z-tag (i.e., the service group VLAN tag) as explained with reference to FIG. 11, for example. At block 1506, a load distribution hash group member lookup for Y-tag (i.e., the new VLAN tag) as explained with reference to FIG. 11, for example. A fragment session lookup occurs at block 1508. If a hit is found at block 1510, then at block 1512 the FPGA uses the Y-tag from the fragment session entry to process the data packet. The FPGA then uses a modified Z-tag along with the Y-tag and sends the data packet. However, if at block 1510 a hit is not found then at block 1516 uses a Y-tag from the group member table and then modifies the Z-tag and sends the data packet along with the Y-tag.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A method comprising:
maintaining, by a session-aware switching device, for each of a plurality of ports of the session-aware switching device, session data including a plurality of session entries each of which represent a previously established traffic session by the session-aware switching device from a particular source device to a particular destination device and each of which form an association between the previously established traffic session and a particular firewall security device of a plurality of firewall security devices associated with the session-aware switching device, wherein the plurality of session entries contain information regarding a source Internet Protocol (IP) address, a destination IP address, a protocol field, a source port number, a destination port number and a Virtual Local Area Network identifier (VLAN ID) and wherein the plurality of firewall security devices are categorized into one or more service groups by associating each of the plurality of firewall security devices with a particular VLAN ID;
responsive to receiving, at a first port of the plurality of ports of the session-aware switching device, a Transmission Control Protocol (TCP) SYN packet of a forward traffic session from a source device directed to a target device:
reducing vulnerability of the session-aware switching device to a denial of service (DoS) attack, by the session-aware switching device, by foregoing installation of a forward session entry for the forward traffic session within the session data for the first port;

selecting, by the session-aware switching device, a firewall security device from among the plurality of firewall security devices to associate with the forward traffic session and a corresponding reverse traffic session from the target device to the source device by performing a load balancing function on at least a portion of the TCP SYN packet;

based on a result of the load balancing function, assigning a Virtual Local Area Network (VLAN) tag to the TCP SYN packet corresponding to the particular VLAN ID with which the selected firewall security device is associated; and causing the TCP SYN packet to be processed by the selected firewall security device;

responsive to receipt from the selected firewall security device the processed TCP SYN packet on a second port of the session-aware switching device, installing, by the session-aware switching device, a reverse session entry for the corresponding reverse traffic session within the session data for the second port with the target device identified as the particular source device and with the source device identified as the particular destination device; and responsive to receipt from the selected firewall security device a processed TCP SYN/ACK packet associated with the corresponding reverse traffic session on the first port of the session-aware switching device, installing, by the session-aware switching device, the forward session entry for the forward traffic session within the session data for the first port with the target device identified as the particular destination device and with the source device identified as the particular source device.

2. The method of claim 1, wherein the source port number and the destination port number comprise a TCP port number, a User Datagram Protocol (UDP) port number or a layer 4 port number.

3. A computer-readable, non-transitory storage medium tangibly embodying a set of instructions, which when executed by one or more processors of a session-aware switching device, cause the one or more processors to perform a method for load balancing among a plurality of firewall security devices associated with the session-aware switching device, the method comprising:

maintaining for each of a plurality of ports of the session-aware switching device, session data including a plurality of session entries each of which represent a previously established traffic session by the session-aware switching device from a particular source device to a particular destination device and each of which form an association between the previously established traffic session and a particular firewall security device of a plurality of firewall security devices associated with the session-aware switching device, wherein the plurality of session entries contain information regarding a source Internet Protocol (IP) address, a destination IP address, a protocol field, a source port number, a destination port number and a Virtual Local Area Network identifier (VLAN ID) and wherein the plurality of firewall security devices are categorized into one or more service groups by associating each of the plurality of firewall security devices with a particular VLAN ID;

responsive to receiving, at a first port of the plurality of ports of the session-aware switching device, a Transmission Control Protocol (TCP) SYN packet of a forward traffic session from a source device directed to a target device:

reducing vulnerability of the session-aware switching device to a denial of service (DoS) attack by foregoing installation of a forward session entry for the forward traffic session within the session data for the first port;

selecting a firewall security device from among the plurality of firewall security devices to associate with the forward traffic session and a corresponding reverse traffic session from the target device to the source device by performing a load balancing function on at least a portion of the TCP SYN packet;

based on a result of the load balancing function, assigning a Virtual Local Area Network (VLAN) tag to the TCP SYN packet corresponding to the particular VLAN ID with which the selected firewall security device is associated; and causing the TCP SYN packet to be processed by the selected firewall security device;

responsive to receipt from the selected firewall security device the processed TCP SYN packet on a second port of the session-aware switching device, installing a reverse session entry for the corresponding reverse traffic session within the session data for the second port with the target device identified as the particular source device and with the source device identified as the particular destination device; and responsive to receipt from the selected firewall security device a processed TCP SYN/ACK packet associated with the corresponding reverse traffic session on the first port of the session-aware switching device, installing the forward session entry for the forward traffic session within the session data for the first port with the target device identified as the particular destination device and with the source device identified as the particular source device.

4. The computer-readable, non-transitory storage medium of claim 3, wherein the source port number and the destination port number comprise a TCP port number, a User Datagram Protocol (UDP) port number or a layer 4 port number.

5. A chassis-based switching device comprising:

a plurality of blades, wherein one of the plurality of blades represents a load balancing hub and all or a subset of a remainder of the plurality of blades represent a plurality of firewall security devices;

a plurality of ports, wherein each of the plurality of ports is coupled to a blade of the plurality of blades;

a memory coupled to the load balancing hub, the memory having stored therein a session table, the session table including, for each of the plurality of ports, a plurality of session entries each of which represent a previously established traffic session from a particular source device to a particular destination device and each of which form an association between the previously established traffic session and a particular firewall security device of the plurality of firewall security devices, wherein the plurality of session entries contain information regarding a source Internet Protocol (IP) address, a destination IP address, a protocol field, a source port number, a destination port number and a Virtual Local Area Network identifier (VLAN ID) and wherein the plurality of firewall security devices are categorized into one or more service groups by associating each of the plurality of firewall security devices with a particular VLAN ID;

wherein responsive to receipt of a Transmission Control Protocol (TCP) SYN packet of a forward traffic session from a source device directed to a target device on a first port of the plurality of ports:

vulnerability of the chassis-based switching device to a denial of service (DoS) attack is reduced by foregoing installation of a forward session entry for the forward traffic session within the session data for the first port;

a firewall security device is selected from among the plurality of firewall security devices with which the forward traffic session and a corresponding reverse traffic session from the target device to the source device are associated by performing a load balancing function on at least a portion of the TCP SYN packet;

based on a result of the load balancing function, a Virtual Local Area Network (VLAN) tag is assigned to the TCP SYN packet corresponding to the particular VLAN ID with which the selected firewall security device is associated; and the TCP SYN packet is caused to be processed by the selected firewall security device;

wherein responsive to receipt from the selected firewall security device the processed TCP SYN packet on a second port of the plurality of ports, a reverse session entry for the corresponding reverse traffic session is installed within the session data for the second port with the target device identified as the particular source device and with the source device identified as the particular destination device; and wherein responsive to receipt from the selected firewall security device a processed TCP SYN/ACK packet associated with the corresponding reverse traffic session on the first port the forward session entry for the forward traffic session is installed within the session data for the first port with the target device identified as the particular destination device and with the source device identified as the particular source device.

6. The chassis-based switching device of claim 5, wherein the source port number and the destination port number comprise a TCP port number, a User Datagram Protocol (UDP) port number or a layer 4 port number.

* * * * *